US006353679B1

(12) United States Patent
Cham et al.

(10) Patent No.: US 6,353,679 B1
(45) Date of Patent: Mar. 5, 2002

(54) SAMPLE REFINEMENT METHOD OF MULTIPLE MODE PROBABILITY DENSITY ESTIMATION

(75) Inventors: Tat-Jen Cham, Boston; James Matthew Rehg, Arlington, both of MA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/185,278

(22) Filed: Nov. 3, 1998

(51) Int. Cl.[7] .................................................. G06K 9/00
(52) U.S. Cl. ........................ 382/228; 382/224; 382/181
(58) Field of Search .......................... 701/207; 382/224, 382/181, 228, 103; 345/419, 420

(56) References Cited

U.S. PATENT DOCUMENTS

| | | | | |
|---|---|---|---|---|
| 5,745,600 A | * | 4/1998 | Chen et al. .................. | 382/218 |
| 5,751,831 A | * | 5/1998 | Ono ............................. | 382/103 |
| 5,903,454 A | * | 5/1999 | Hoffberg et al. ............. | 364/188 |
| 5,920,477 A | * | 7/1999 | Hoffberg et al. ............. | 364/148 |
| 5,961,571 A | * | 10/1999 | Gorr et al. ................... | 701/207 |

OTHER PUBLICATIONS

Ahrens, J.H. et al, Extensions of Forsythe's Method for Random Sampling from the Normal Distribution, Math. Comput., 27, 124 (Oct. 1973), pp. 927–937, Netlib repository at http://www.netlib.org/particularly in the file www.netlib.org/random/ranlib.c.tar.gz. Also, www.netlib.org/TOMS/599.
Anderson, B.D.O. et al., Optimal Filtering, Prentice–Hall, Inc., 1970.
Astrom, K.J., Introduction to Stochastic Control Theory, Academic Press.

(List continued on next page.)

Primary Examiner—Leo Boudreau
Assistant Examiner—M B Choobin
(74) Attorney, Agent, or Firm—Cesari and McKenna, LLP

(57) ABSTRACT

The invention recognizes that a probability density function for fitting a model to a complex set of data often has multiple modes, each mode representing a reasonably probable state of the model when compared with the data. Particularly, sequential data such as are collected from detection of moving objects in three dimensional space are placed into data frames. Also, a single frame of data may require analysis by a sequence of analysis operations. Computation of the probability density function of the model state involves two main stages: (1) state prediction, in which the prior probability distribution is generated from information known prior to the availability of the data, and (2) state update, in which the posterior probability distribution is formed by updating the prior distribution with information obtained from observing the data. In particular this information obtained purely from data observations can also be expressed as a probability density function, known as the likelihood function. The likelihood function is a multimodal (multiple peaks) function when a single data frame leads to multiple distinct measurements from which the correct measurement associated with the model cannot be distinguished. The invention analyzes a multimodal likelihood function by numerically searching the likelihood function for peaks. The numerical search proceeds by randomly sampling from the prior distribution to select a number of seed points in state-space, and then numerically finding the maxima of the likelihood function starting from each seed point. Furthermore, kernel functions are fitted to these peaks to represent the likelihood function as an analytic function. The resulting posterior distribution is also multimodal and represented using a set of kernel functions. It is computed by combining the prior distribution and the likelihood function using Bayes Rule. The peaks in the posterior distribution are also referred to as 'hypotheses', as they are hypotheses for the states of the model which best explain both the data and the prior knowledge.

7 Claims, 23 Drawing Sheets

OTHER PUBLICATIONS

Bar–Shalom, Yaakov, Tracking and Data Association, Academic Press—Harcourt, Brace, Jovanovich, 1980.

Bregler, C. et al., Video Motion Capture, www.cs.berkeley.edu/bregler/digmuy.html.

Brookner, Eli, Tracking and Kalman Filtering Made Easy, John Wiley & Sons, Inc., pp. 1–64, 1998.

Cox, I., et al., A Bayesian Multiple–Hypothesis Approach to Edge Grouping and Contour Segment, International Journal of Computer Vision, 11:1, 5–24, 1993.

Cox, I., et al., An Efficient Implementation of Reid's Multiple Hypothesis Tracking Algorithm and Its Evaluation for the Purpose of Visual Tracking, IEEE Transactions On Pattern Analysis and Machine Intelligence, vol. 18, No. 2, Feb. 1996, pp. 138–150.

Gavrila, et al., 3D Model–Based Tracking of Humans in Action: A Multi–View Approach, www.umiacs.umd.edu/users/{gavrila,lsd}/ CAR–TR–799, CS–TR–3555, Nov. 1995.

Hoel, P., Introduction to Mathematical Statistics, Third Edition, John Wiley and Sons, Inc., 1962, pp. 1–17.

Isard, M. et al., Condensation—conditional density propagation for visual tracking International Journal of Computer Vision 29:1, 5–28, 1998.

Isard, M. et al., A mixed–state Condensation tracker with automatic model–switching, pp. 107–112.

Ju, S. et al., Cardboard People: A Parameterized Model of Articulated Image Motion, juxuan@vis.toronto.edu, black@parc.xerox.com, yaser@umiacs.umd.edu, undated.

Kakadiaris, I., Model–Based Estimation of 3D Human Motion with Occlusion Based on Active Multi–Viewpoint Selection, CVPR 1996, pp. 81–87.

Knuth, D.E., The Art of Computer Programming, Third Edition, vol. 2, Addison–Wesley, Sep. 1997, pp. 119–113.

O'Rourke, et al., Model–Based Image Analysis of Human Motion Using Constraint Propagation, IEEE Transactions On Pattern Analysis and Machine Intelligence, vol. PAMI–2, No. 6, Nov. 1980.

Pentland, A. et al., Recovery of Nonrigid Motion and Structure, IEEE Transactions On Pattern Analysis and Machine Intelligence, vol. 13, No. 7, Jul. 1991.

Press, W.H. et al., Numerical Recipes in C, The Art of Scientific Computing, Second Edition, Cambridge University Press, 1994, pp. 287–296.

Rao, B., Data Association Methods for Tracking Systems.

Rasmussen, C. et al., Joint Probabilistic Techniques for Tracking Multi–Part Objects, CVPR 1998, pp. 16–21.

Rehg, J., et al., DigitEyes: Vision–Based Hand Tracking for Human Computer Interaction, IEEE Workshop on Motion of Non–Rigid and Articulated Objects, Austin, TX, J. Aggrawal and T. Huang eds., Nov. 1994, pp. 16–22.

Rehg, et al., Model–Based Hand Tracking of Self–Occluding Articulated Objects, 5th International Conference on Computer Vision, Cambridge, MA, Jun. 1995.

Rehg, J. et al., Visual Tracking of High DOF Articulaated Structures: an Application to Human Hand Tracking, Third European Conference on Computer Vision, Stockholm, Sweden, J. Eklundh Ed. May, 1994, vol. II, pp. 35–36.

Shimada, N et al., Hand Gesture Estimation and Model Refinement using Monocular Camera—Ambiguity Limitation by Inequality Constraints, IEEE 1998, pp. 268–273.

Yacoob, Y. et al., Learned Temporal Models of Image Motion, Computer Vision Laboratory, University of Maryland, College Park, Maryland, yaser/lsd@umiacs.umd.edu, pp. 446–453.

* cited by examiner

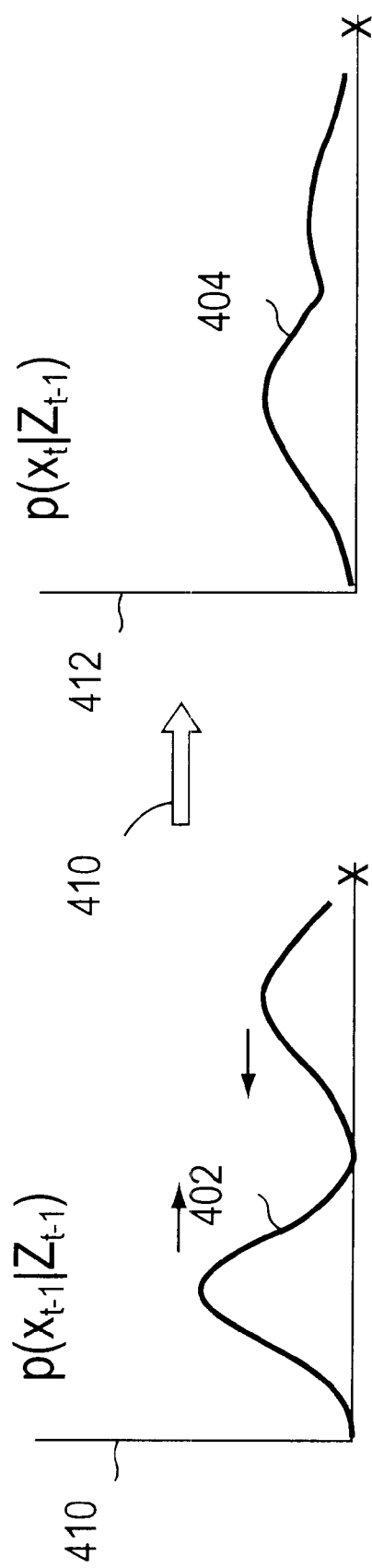

SAMPLE REFINEMENT METHOD OF MULTIPLE MODE PROBABILITY DENSITY ESTIMATION

RELATED APPLICATIONS

This Application is related to the patent applications titled "Multiple Mode Probability Density Estimation with Application to Multiple Hypothesis Tracking" by Tat-Jen Cham and James M. Rehg, filed on Nov. 3, 1998 with Ser. No. 09/185,279, all disclosures of which are incorporated herein by reference, and "Multiple Mode Probability Density Estimation with Application to Sequential Markovian Decision Processes" by Tat-Jen Cham and James M. Rehg, filed on Nov. 3, 1998 with Ser. No. 09/185,280, all disclosures of which are incorporated herein by reference.

FIELD OF THE INVENTION

This invention relates to explaining data representing physical objects by a model of those objects through a probability method of analysis.

BACKGROUND

Multidimensional data can be collected by means of many different physical processes, for example: images may be collected by a video camera; by radar systems; by sonar systems; by infrared systems; by astronomical observations of star systems; by medical imaging using x-rays with dynamic image recording, magnetic resonance imaging, ultrasound, images of the Earth by satellite imagery, or by any other technology capable of generating an image of physical objects. The image data may then be analyzed in order to track targets of interest. Tracking is the recursive estimation of a sequence of states that best explains a sequence of observations. The states are specifications of the configuration of a model which is designed to explain the observations.

As an example, in tracking a human figure in a sequence of video frames a human "stick model" can be used. A line having both length and orientation can be used to represent each major skeletal bone such as lower arm, upper arm, lower leg, upper leg, trunk, head, shoulder girdle, etc. A particular frame of the video can be specified by giving the length, position, and orientation of each of the lines used in the stick model. The "state" is the collection of data required to completely specify the model. The state is used to compute a predicted image in the next video frame, and the recursive estimation process is used to refine the state values by comparing the predicted image with the data gathered by the video camera. As a further example, radar, acoustic, x-ray, etc. data can be used to generate images of the physical objects being observed, and a model of the objects can be used to aid in computation of a predicted image. The state is the set of data required to completely specify the model, for example the location of each aircraft in a radar produced-image for air traffic control purposes.

Modem detectors often return a very large amount of data. For example, a simple video camera produces approximately 30 flames per second (depending on the video protocol) with each frame having approximately 300 pixels horizontally across the image and 200 rows of pixels vertically in the image to yield 60,000 pixels in each image (again the details depending upon the video protocol). It is a very computation intensive process to generate a predicted image for each frame and to compare the predicted image with the actual data in order to refine the state of a model for tracking purposes.

Kalman filter tracking has been successful as a tool for refining the parameters of a model in cases where a probability density function is sufficiently simple. Kalman filters are described by Eli Brookner in the book *Tracking and Kalman Filtering Made Easy*, published by John Wiley & Sons, Inc., in 1998, all disclosures of which are incorporated herein by reference. However, as data gathered by detectors becomes more complex, and the complex data requires the models to distinguish between ambiguous representations of the data, the simple approach to tracking by Kalman filtering breaks down.

There is needed an improved method for refining the state of a model of objects, where predictions of the model are compared with the large amounts of data produced by modern detectors.

SUMMARY OF THE INVENTION

The invention recognizes that a probability density function for fitting a model to a complex set of data often has multiple modes, each mode representing a reasonably probable state of the model when compared with the data. Particularly, sequential data such as are collected from detection of moving objects in three dimensional space are placed into data frames. Also, a single frame of data may require analysis by a sequence of analysis operations. Computation of the probability density function of the model state involves two main stages: (1) state prediction, in which the prior probability distribution is generated from information known prior to the availability of the data, and (2) state update, in which the posterior probability distribution is formed by updating the prior distribution with information obtained from observing the data. In particular this information obtained purely from data observations can also be expressed as a probability density function, known as the likelihood function. The likelihood function is a multimodal (multiple peaks) function when a single data frame leads to multiple distinct measurements from which the correct measurement associated with the model cannot be distinguished. The invention analyzes a multimodal likelihood function by numerically searching the likelihood function for peaks. The numerical search proceeds by randomly sampling from the prior distribution to select a number of seed points in state-space, and then numerically finding the maxima of the likelihood function starting from each seed point. Furthermore, kernel functions are fitted to these peaks to represent the likelihood function as an analytic function. The resulting posterior distribution is also multimodal and represented using a set of kernel functions. It is computed by combining the prior distribution and the likelihood function using Bayes Rule. The peaks in the posterior distribution are also referred to as 'hypotheses', as they are hypotheses for the states of the model which best explain both the data and the prior knowledge.

The invention solves the problem of ambiguous data frames or ambiguous model predictions which can occur when the objects occlude each other, or a particular data frame is otherwise difficult or impossible to interpret The model follows the most probable set of model states into the future, and any spurious paths will usually develop low probabilities in future data frames, while good (i.e. "correct") model states continue to develop high probabilities of representing the new data frames, as they are detected. By following predictions from a reasonable number of points in state space, the analysis scales well with large amounts of detected data.

BRIEF DESCRIPTION OF THE DRAWINGS

For a fuller understanding of the nature of the invention, reference should be had to the following detailed description

FIG. 4A and FIG. 4B are graphs showing use of a predictor in moving a conditional probability density forward in time, in accordance with the invention.

DETAILED DESCRIPTION

Figure 1:
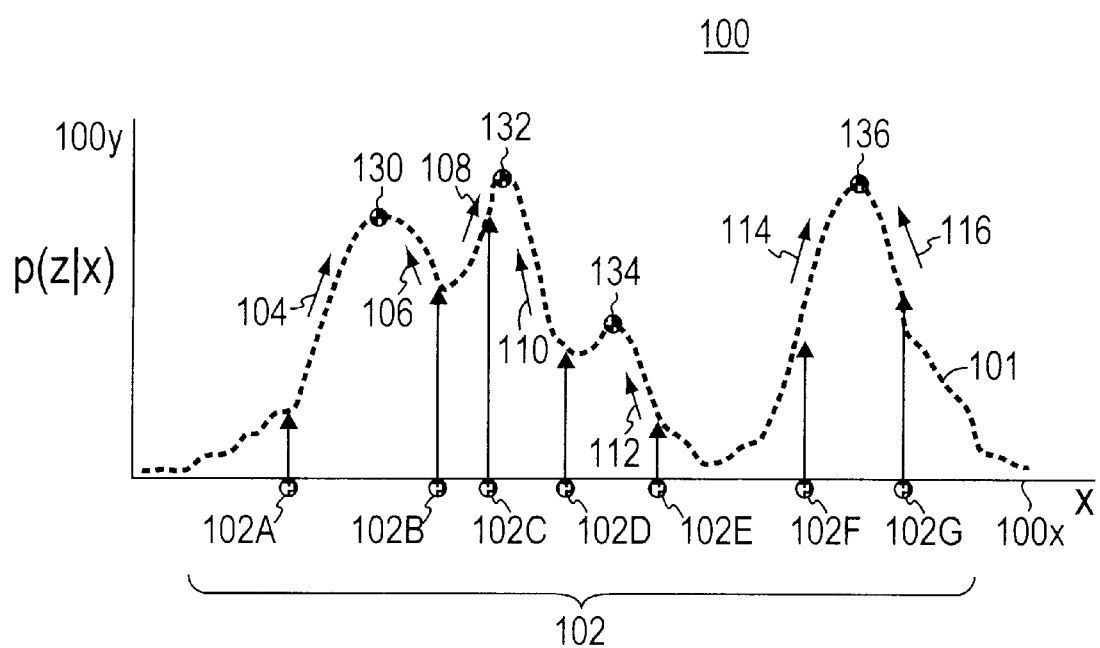
FIG. 1 is a plot of a multimode probabilityn density function as computed from Equation 1, in accordance with the invention.

Turning now to FIG. 1, graph 100 shows a plot obtained by numerical evaluation of a multimodal probability density function obtained by using square error between an observation and a prediction based on earlier observations. The probability density function p(z|x) is plotted in state space. The variable z denotes a set of data and the vector x represents a point in state space. State space is a multi-dimension space having a dimension for each variable of the model. For example, a simple single target model in a radar scan may have three position coordinates and three velocity coordinates, for a total of six variables, leading to a state space of six dimensions. More complex models will have more coordinates, leading to more dimensions in state space. The probability density function is plotted along a further axis which is not a part of state space. FIG. 1 is plotted in the exemplary special case of one dimension in state space, with the state space dimension plotted along the x-axis 100X, and the probability density function plotted along the y-axis 100Y.

An exemplary equation for a probability density function is given below as Equation 1. The form of Equation 1 is specialized for the analysis of a sequence of frames of data obtained sequentially, with time as the parameter identifying the frames. The probability density function $p(z_t|x_t)$ of Equation 1 is a conditional probability function which is more specifically known as a likelihood function:

$$p(z_t | x_t) \alpha \exp\left[-\sum_u ((I(u) - T(u, x_t))^2 / 2\sigma^2)\right] \quad \text{Eq. 1}$$

Frames of data are constructed sequentially, frames are indicated by the symbol $z_t$, and the subscript "t" indicates that the sequence of frames are taken during successive time intervals.

The state vector $x_t$ describes the model by indicating a point in state space which specifies all parameters of the model, where the parameters are evaluated in response to sequential measurements collected into frame $z_t$. The vector form is indicated by boldfacing.

The vector u is a two dimensional vector indicating a point in a two dimensional projection of the objects being detected and modeled. For example, the vector u may indicate a pixel in a computer display. The vector is indicated by boldfacing.

I(u) is a value of the measurement represented at the two dimensional image point given by vector u. I(u) may, for example, represent a pixel value in the two dimensional projection as presented on a television screen, or on a computer screen.

$T(u, x_t)$ is the modeled value at the same pixel given by vector u, based upon evaluating the parameters at the state space point designated by the state vector x as determined at time t.

The square error, normalized by a variance σ, for each point in the image is given by:

$$(I(u) - T(u, x_t))^2 / \sigma^2.$$

The sum in Equation 1 is over all points in the two dimensional image which are computed from the measurements.

Equation 1 is written for comparing predicted and actual responses of detectors. The detectors could be a radar tracking system, a television camera, a system of microphones, etc. The data is collected in frames in order to project a sequence of frames indicating motion of the objects. Each frame of data is collected during a selected time interval, and the frames collected during different time intervals are indicated by the variable t, which specifies the time interval.

The symbol $p(z_t|x_t)$ is the conditional probability that the measurements $z_t$ are reproduced by the model using state point $x_t$. By a conditional probability is meant that, assuming that the state vector $x_t$ is known: "What is the probability that the measurement I(u) will agree with the computed value T(u, $x_t$), as computed by Eq. 1?". Conditional probabilities are discussed further by Paul G. Hoel in the book *Introduction to Mathematical Statistics, Third Edition*, published by John Wiley and Sons, Inc., in 1962, all disclosures of which are incorporated herein by reference.

FIG. 1 gives a plot of $p(z_t|x_t)$ in the simple case that x is one dimensional. Graph 101 of $p(z_t|x_t)$ shows that the $p(z_t|x_t)$ function is multimodal. By multimodal is meant that the probability density function $p(z_t|x_t)$ has several peaks, and each peak corresponds to a state point which could represent the data with substantially high probability. Graph 101 is shown as a dotted line because there is no analytical expression for the graph. The form of the graph 101 must be explored numerically at discrete points, as represented by the dotted line.

In accordance with the invention, in order to recover the peaks of $(pz_t|x_t)$, a set of seed points are selected by randomly sampling from the prior distribution $p(x_t|z_{t-1})$. A numerical search starts at each seed point, and the searches from the seed points find the peaks in the likelihood function. In a given frame of data, a different set of seed points should converge to the same set of peaks. Kernel functions, such as Gaussian functions, are fitted to these peaks to represent the entire likelihood function as an analytic function. The likelihood function, expressed as a set of kernel functions, can then be combined using Bayes' Formula with the prior distribution to compute the posterior distribution, which may also be expressed as a set of kernel functions. The modes of the posterior distribution are referred to as hypothesis, and in a sequential data problem are propagated forward in time through a prediction process to form the modes in the new prior distribution.

The peaks in the probability density function are located by a numerical search method. The expression for $p(z_t|x_t)$ is in a form which can be evaluated numerically at any point x in state space. And the function $p(z_t|x_t)$ is searched for maxima. For example, a gradient search method may be employed to find the peaks of the $p(z_t|x_t)$ function.

For example, a set of seed points 102 is shown in FIG. 1. The maxima of $p(z_t|x_t)$ are found by, for example a gradient search. Arrows 104, 106, 108, . . . 116 show the paths that a gradient search takes in state space as the search attempts to find the maxima of the function $p(z_t|x_t)$. Path 104 began at seed point 102A; path 106 began at seed point 102B; and etc.

Various seed points for the gradient search converge on various peaks as the search proceeds. For example, both paths 102 and 106 converge on peak 130. Path 108 and path 110 both converge on peak 132. Path 112 converges on peak 134. Both paths 114 and 116 converge on peak 136.

Kernel functions are fitted to each of the peaks to form an analytic likelihood function. Examples of kernel functions are Gaussian and spline basis functions.

Figure 2:
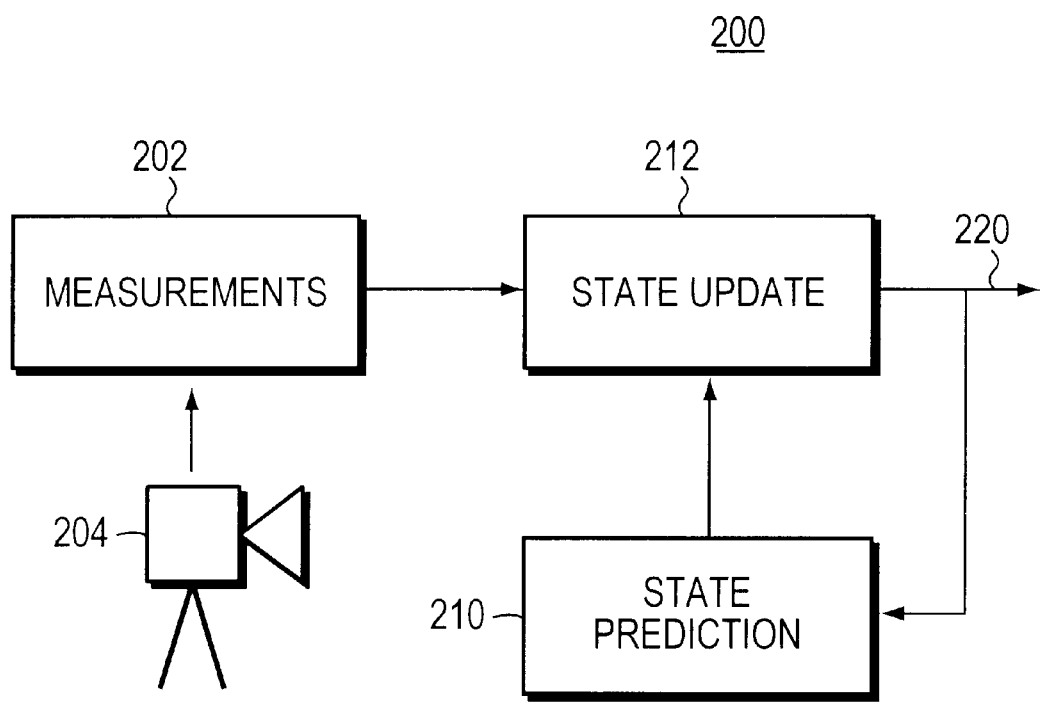
FIG. 2 is a block diagram of a calculation for a tracking algorithm.

Turning now to FIG. 2, block diagram 200 for a typical tracking algorithm is shown. Measurements are made at block 202 by sensors 204. The state is predicted at block 210 based upon measurements made earlier in time. At block 212 a comparison is made between the new measurements made at block 202 and the state prediction made at block 210, and as a result of the comparison, the state is updated. The updated state parameters are available as output on line 220 for use by other processes. New measurements are then completed at block 202, and the sequence of comparison and state update repeated on a convenient time scale determined by the rate at which new data can be framed and the state update calculated.

Figure 3:
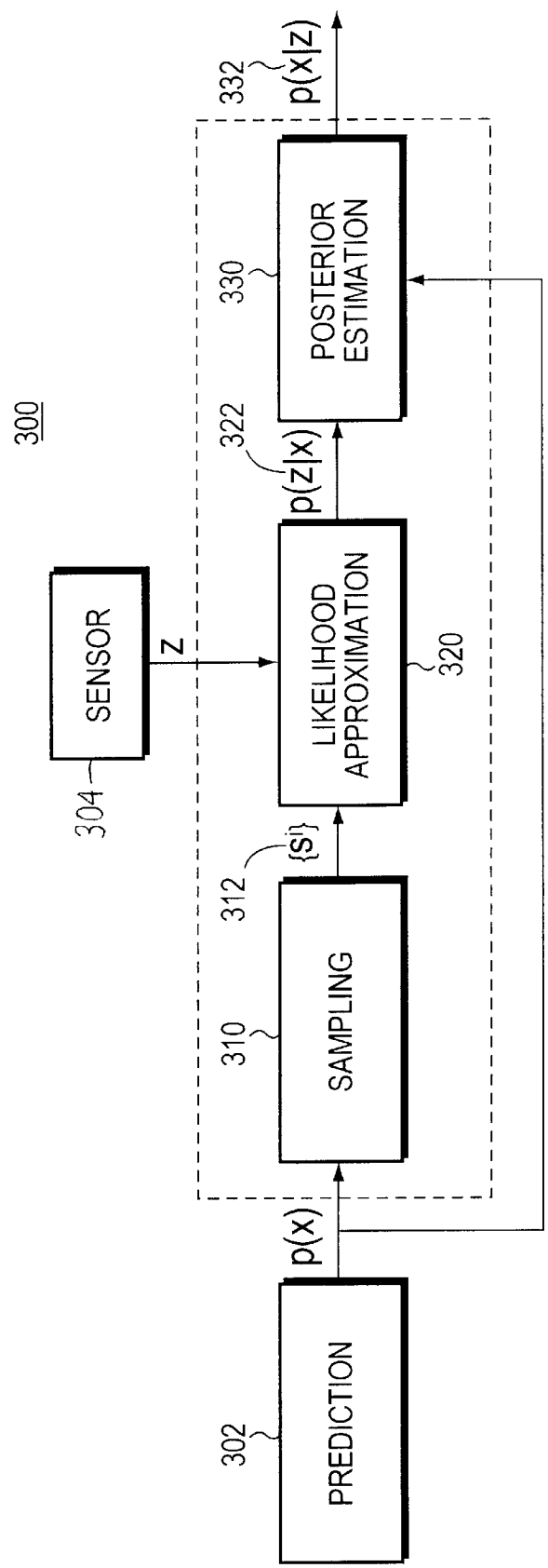
FIG. 3 is a block diagram of a multiple-hypothesis tracking algorithm in accordance with the invention.

Turning now to FIG. 3, a block diagram 300 of the multi-hypothesis tracking algorithm of the invention is shown. State prediction is shown at block 302, at which the model from the likelihood approximation from the last data frame is brought up to date for each hypothesis point by a predictor calculation. Sensor 304 provides the next frame of data. The comparison of measured values with predicted values and the state update of block 212 is done in three steps. The steps are (1) hypothesis sampling at block 310 to produce a sample of a plurality of starting points $\{s^i\}$ 312 in state space to initiate prediction for the next frame of data; (2) likelihood approximation at block 320 in response to the plurality of starting points $\{s^i\}$ 312, and in response to the next frame of data from sensors 304 to compute the conditional probability $p(z|x)$ 322, giving the probability that new data frame z will occur given the state space point of state space vector x, for each selected peak of $p(z|x)$ and, (3) posterior estimation at block 330 to give the conditional probability $p(x|z)$ 332 that given the frame z which is propagated forward using a predictor calculation, that the state vector x will occur, and this calculation is performed using Bayes' Equation. The set of seed points of the sample $\{s^i\}$ 312 lead to multiple modes in probability density $p(x|z)$ 332. A selection criteria can be used to select the "best" modes from probability density $p(x|z)$ 332 to improve computational efficiency by ignoring "weaker" modes.

The "best" modes of probability density $p(x|z)$ may be selected by several different methods. In a first exemplary embodiment of the invention all peaks found in the numerical search are selected as best modes. In a second exemplary embodiment of the invention, the highest peaks are selected, for example the highest ten peaks. In an alternative embodiment, and in response to the nature of the problem being solved, the peaks with the greatest area may be selected as the best modes. In a preferred embodiment of the invention in which a stick figure model was used to track an image of a person in a sequence of video frames, the best modes were chosen as the ten highest peaks, that is the ten most probable modes.

Terminology is now introduced for tracking problems involving a sequence of data frames taken over a period of time. The data frames taken at time "t" are indicated by a subscript, as $z_t$. The state space vectors obtained to best "explain" a data frame taken at time t is indicated by a subscript "t", as $x_t$. Definitions for important conditional probability density functions are:

Likelihood function $p((z_t|x_t)$ which is the probability calculated from Equation 1, that given state vector $x_t$, the frame of data is explained by the model evaluated at the point in state space indicated by the state vector $x_t$. Both the frame of data and the state vector are evaluated for the same time t.

Prior function $p(x_t|z_{t-1})$, which is calculated from the posterior function by application of the dynamic model. The state vector evaluated at an earlier time, (t−1) is used to predict the data at a future time t.

Posterior function $p(x_t|z_t)$, answers the question, given the data frame z, what is the probability of the state vector being x, where both are evaluated at the time t, as shown by the subscripts.

Turning now to FIG. 4A and FIG. 4B, graphs 402 and 404 show the effect of applying a dynamic predictor to the conditional probability density $p(x_{t-1}|z_{t-1})$ 410 in order to compute $p(x_t|z_{t-1})$ 412 is shown. This calculation starts with both the state space vector $x_{t-1}$ and the last frame of data $z_{t-1}$ at time (t−1) and computes the conditional probability distribution for the state space vector xt for the next time frame. For example, a constant velocity predictor with added random noise may be used to perform this calculation to project state space vector $x_{t-1}$ forward in time. A constant velocity predictor assumes that any object being tracked continues to move in a straight line with constant velocity from the last measured frame to the next frame. Alternatively, a constant acceleration predictor may be used where it is assumed that the acceleration is constant from frame to frame, and the changes in velocity are calculated accordingly, along with the addition of random noise.

Figure 5A:
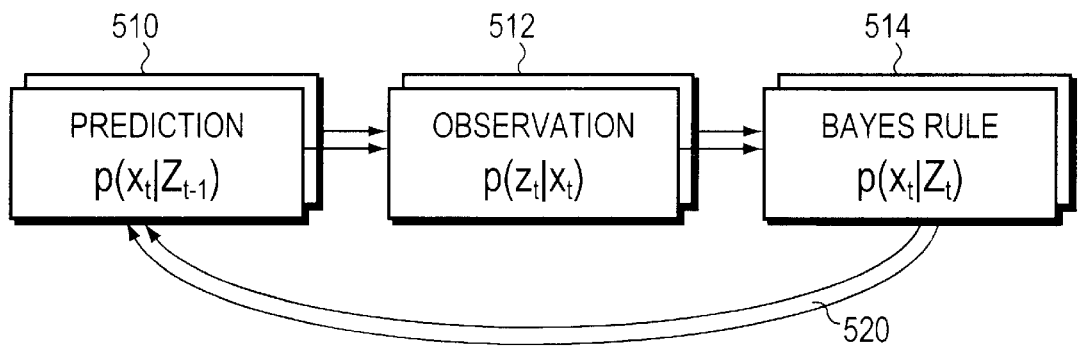
FIG. 5A is a block diagram of a multiple hypothesis tracking algorithm using Bayes' Formula, in accordance with the invention.

Turning now to FIG. 5A, flow diagram 500 shows the use of Bayes' formula for calculating the next prediction. At block 510 a state space point given by state vector $x_t$, based on the last recorded frame $z_{t-1}$ recorded at time (t−1) is used to predict the data observed from the objects being monitored. State vector $x_t$ at time (t) is computed, for example, by the predictor method described with reference to FIG. 4. Comparison of the prediction from block 510 with the observations of block 512 leads to a new conditional probability density function for frame $z_1$ as shown in block 512 as $p(z_t|x_t)$. At block 514 Bayes' Formula is used to compute the complementary probability density function $p(x_t|z_t)$. Bayes' formula is:

$$p(x|z)=k\,p(z|x)p(x) \qquad \text{Eq. 2}$$

where both x and z are evaluated at the same time frame. The new value of the conditional probability density $p(x|z)$ is returned along path 520 to block 510 for analysis of the next frame of data $z_{t+1}$ which is measured at time (t+1).

By following multiple hypotheses, the occurrence of ambiguities in the model representing the objects are resolved as subsequent data becomes available during unfolding of the motion from frame to frame over time. That is, the model may give substantially equal probabilities for different state space $x_t$ points at a particular frame $z_t$ so that the calculations cannot resolve which is the "best" state space point to represent the objects. However, by following all of the substantially "best" state space points into future frames, the motion of the objects will usually resolve the ambiguities as the observations are compared with the predictions of the "best" state space points, and their projection into the future, where the comparison is done using Equation 1.

Following multiple modes in the probability density function of Equation 1 leads to manageable numbers of state space points to follow into the future, by the simple expedient of relying on the probabilities computed using Equation 1 and following only the largest modes from frame to frame. By following only the largest modes as computed from Equation 1 from frame to frame, spurious tracks in state space will usually develop small probabilities in future frames. That is, a spurious track will usually yield small probabilities from Equation 1 as the prediction disagrees more and more over time with the observations, and the spurious tracks will then be dropped from the selected hypothesis points.

The steps in predicting forward for one frame of data may be summarized as follows:

Step 1. Start with the probability of x given frame z, both evaluated from the previous calculation at time (t−1):

$$p(x_{t-1}|z_{t-1}).$$

The function $p(x_{t-1}|z_{t-1})$ is referred to as the posterior probability density function.

Step 2. Use system predictor to move the model parameters forward in time to t. For example, a constant velocity predictor may be used. Alternatively, a constant acceleration model may be used. This calculation gives the probability of x at time t given frame z at time (t−1):

$$p(x_t|z_{t-1})$$

Approximate probability density functions for each of the modes in the next time frame are estimated from the prior time frame. A dynamical model is applied to the modes of the posterior distribution of the previous time frame to predict the new location of the modes, followed by increasing the covariance of the Gaussian components according to the process noise, as shown with reference to FIG. 4. This amount of process noise is dictated by the accuracy of the dynamical model. This may also be viewed as an approximation to the result:

$$p(x_t|Z_{t-1})=\int_{xt}p(x_t|x_{t-1})p(x_{t-1}|Z_{t-1}) \qquad \text{Eq. 3}$$

where $p(x_t|x_{t-1})$ is a Gaussian centered on the new mode with covariance equal to the process noise covariance. Here $x_t$ is assumed to be conditionally independent of $Z_{t-1}$. The autocorrelation calculation folds process noise into the dynamical model by broadening the kernel functions associated with each mode, as shown by the peaks of curve 404 being broader than the peaks of curve 402.

In a successful approximation in an exemplary embodiment of the invention in tracking a human with a stick figure in a sequence of video frames, the prior function was found to be weak. Accordingly, the posterior function was approximated by the likelihood function, and the likelihood function was computed by a numerical search for the peaks of Equation 1.

Step 3. Select a set of samples from the $p(x_t|z_{t-1})$ distribution for performing a gradient search. The set of samples is designated as $\{s^i\}$, as shown in FIG. 3. Each state space point selected for the sample is referred to as a "seed" point.

The sample points are selected by random sampling of the prior distribution $p(x_t|z_{t-1})$. In an exemplary embodiment, each mode of the prior distribution is allocated a different number of samples according to their peak probabilities. Each mode is associated with a Gaussian kernel function, and for each mode a set of random samples is obtained by sampling from the associated Gaussian distribution. The number of random samples obtained in each set is the amount allocated to the mode as described. Sampling from a Gaussian distribution, in an exemplary embodiment of the invention, is carried out using the "rejection method" of random sample generation. The rejection method is described in the references: W. H. Press, et al., in the book *Numerical Recipes in C, Second Edition*, published by Cambridge University Press, 1992, pages 287–297; D. E. Knuth, *The Art of Computer Programming Third Edition, Volume* 2, published by Addison Wesley, in 1998, pages 119–133; and in the computer code available at the Netlib repository at http://www.netlib.org/, particularly in the file www.netlib.org/random/ranlib.c.tar.gz, and as described by Ahrens, J. H. and Dieter, U., in the article *Extensions of Forsythe's Method for Random Sampling from the Normal Distribution, Math. Comput.*, 27, 124 (October. 1973), pages 927–937. The Netlib repository contains freely available software, documents, and databases of interest to the numerical, scientific computing, and other communities. The repository is maintained by AT&T Bell Laboratories, the University of Tennessee, and Oak Ridge National Laboratory.

Figure 5B:
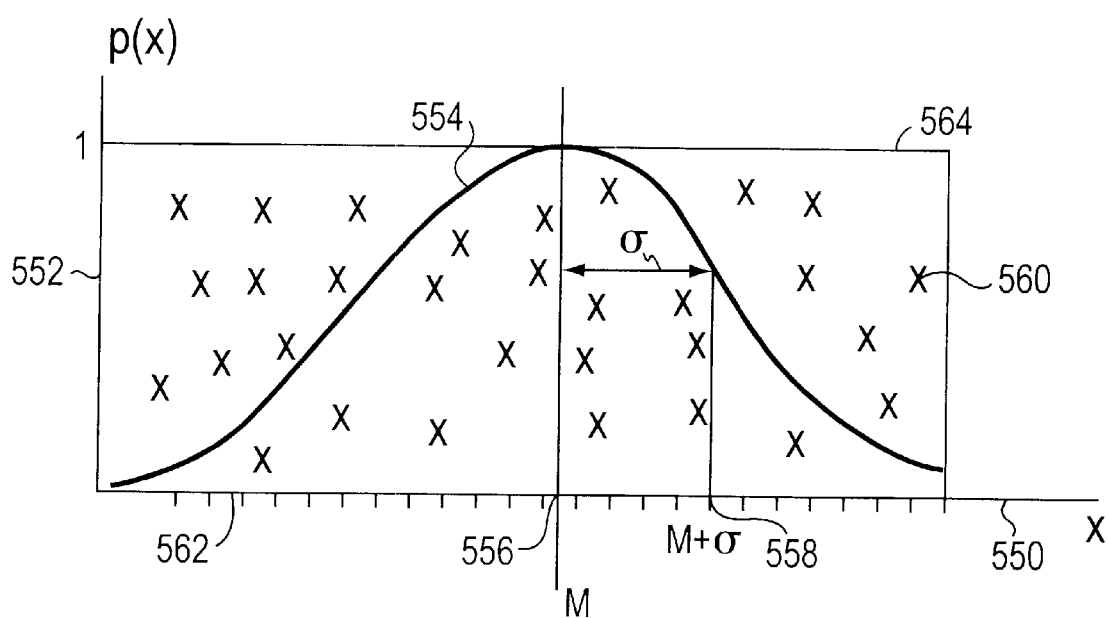
FIG. 5B is a graph illustrating the rejection method of random probability distribution generation.

The rejection method of generating a random Gaussian distribution is illustrated in FIG. 5B. The independent variable x is plotted along the horizontal axis 550, and the probability distribution p(x) is plotted along the vertical axis 552. A Gaussian function 554 is drawn with a mean 556 and a variance shown at the point m+variance 558. A random number generator which picks random numbers having a linear distribution picks many random points 560 in the plane of the figure, and restricted within a rectangle 564 enclosing a principal part of the Gaussian function 554. Bins 562 are set up along the horizontal axis 550 for counting the number of random points 560 which are chosen below the Gaussian function 554. The number of random points 560 within the rectangle and below the Gaussian function give the randomly determined Gaussian distribution, and are determined by counting the number of random points 560 falling within each bin 562.

The seed points for beginning the numerical search in the next data frame are selected by generating a Gaussian random distribution in state space, a multidimensional space. Instead of finding the number of random points 560 in a two dimensional plane, the process finds random points in the multi-dimensional space of state space. Seed points for the next numerical search are accordingly selected, and the next frame of data is analyzed by searching for peaks in the likelihood function for the next frame of data using the seed points.

The peaks found by the numerical search should be independent of the set of seed points. This independence can be verified by repeating the numerical search with a different selection of seed points in state space.

Step 4. Perform the gradient search to locate the modes of Equation 1, and thereby obtain the likelihood function:

$$p(z_t \uparrow x_t).$$

The set of "seed" points usually leads to a set of peaks in the likelihood function $p(z_t|x_t)$, as shown in FIG. 1. The multiple peaks are referred to as modes of the likelihood function. A different set of seed points should lead to substantially the same set of peaks in the likelihood function, particularly the highest peaks which represent the best hypothesis points for the next frame of data.

Perform the gradient search using Equation 1, where Equation 1 is evaluated for the frame z at time t, that is Equation 1 is evaluated for frame $z_t$. The likelihood function gives the probability of computing frame $z_t$ when the state space vector x is given, and both are evaluated at time t.

Then fit kernel functions to the likelihood function $p(z_t|x_t)$ in order to interpolate the likelihood function in state space.

In a preferred embodiment of the invention, Picewise Gaussian functions in the multidimensional state space are fit to the modes of the likelihood function. Piecewise Gaussian functions are of the form:

$$p(x) = k \max_i \{p_i \exp(-1/2(x - m_i)^T S_i^{-1}(x - m_i)), i = 1 \cdot N\}$$

Alternatively, triangular kernel functions, or other convenient kernel functions which maintain the characteristic multimode nature of $p(z_t|x_t)$, may be used to fit the modes of the likelihood function $p(z_t|x_t)$.

Step 5. Use Bayes' Equation, as given in Eq. 2, to calculate $p(x_t|z_t)$, which is the probability of selecting state space vector $x_t$ given data frame $z_t$ where both are now evaluated at time (t).

In an exemplary embodiment this calculation may be done by considering all pairwise combinations of kernel functions, where each pair comprises of one kernel function from the prior distribution and one kernel function from the likelihood function. The pair of kernel functions are multiplied to form a single kernel function in the posterior distribution. Applying this to all such pairwise combinations of kernel functions will generate all modes of the posterior distribution, from which only the best modes may be selected for computational efficiency.

Step 6. Collect a new frame of data and return to step 1, where the value of $p(x_t|z_t)$ now becomes the posterior probability function, as the time t now becomes the old time (t−1) for the new data frame.

Figure 6:
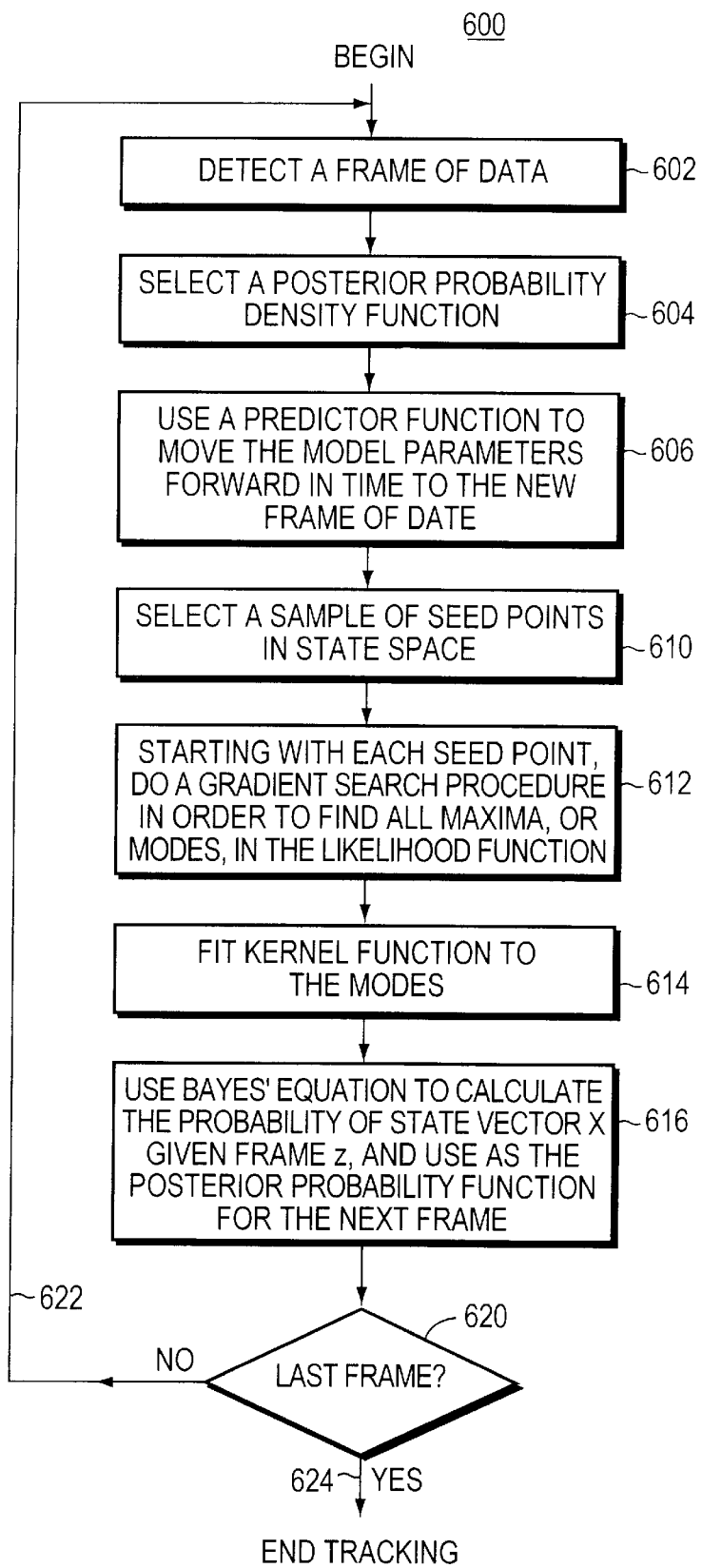
FIG. 6 is a flow chart for tracking a multimode likelihood function.

Turning now to FIG. 6, flow chart 600 gives the steps in tracking objects using data which produces a multimode likelihood function, as computed by Equation 1. At block 602 a frame of data is received by a computer which does the process calculation. At block 604 a posterior probability distribution is selected, either from a first approximation made by a person, or from the last frame of data for which tracking calculations were done. At Step 1 mentioned above, the posterior probability distribution is referred to as $p(x_t|z_{t-1})$ Next, at block 606 a predictor function is used to update the model prediction to give the probability distribution $p(x_t|z_{t-1})$. The calculation of block 606 is shown in FIG. 5A, and is mentioned in Step 2 above.

Next, at block 610 a sample of "seed" points is selected, and the seed points are used for continuing the prediction into the next time frame of data. A random process for selecting the seed points along each axis of state space uses a Gaussian random selection algorithm. Selection of seed points is mentioned in reference to FIG. 1, and Step 3 above.

Then at block 612 the seed points are used as starting points for a numerical search for maxima, or modes, of the probability density function given by Equation 1. The peaks, as shown in FIG. 1, are found by a numerical search. A gradient search may be used as mentioned in Step 4 above.

At block 614 kernel functions are fit to the peaks, or modes, of the likelihood function, as also described at Step 4 above. Then, at block 616 Bayes' Equation, as shown in Equation 2, is used to calculate the probability density function $p(x_t|z_t)$ as mentioned at Step 5 above.

At block 620 the data is checked to determine if the last frame of data has been analyzed, and if another frame of data is expected, the process goes along path 622 to block 602 in order to repeat the calculation steps for the next frame of data. In the event that the last frame of data has been analyzed, the process goes to branch 624 and ends.

First Exemplary Embodiment, Human Figure Tracking

Figure 7:
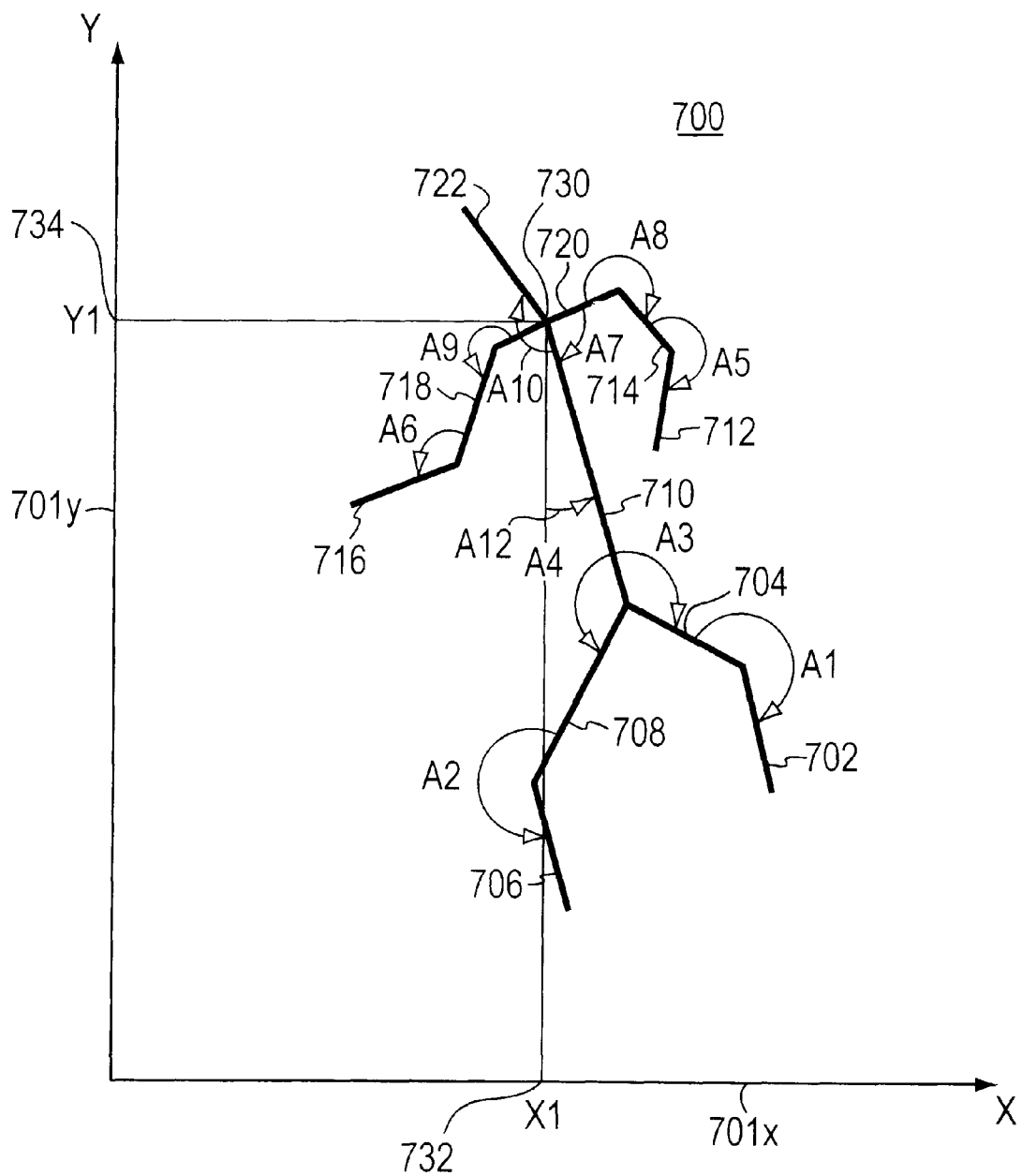
FIG. 7 shows a model of a human figure.

Turning now to FIG. 7, an exemplary embodiment of the invention used for tracking a human figure in a sequence of video frames is shown. Image 700 represents a stick figure model of a human whose body is depicted on a television or computer, etc. screen (not shown). The image is constructed to represent data taken by detectors of a 3 dimensional configuration of objects, where the data is presented as a 2 dimensional image. Accordingly, the human is taken as existing in 3 dimensional space, and image 700 is the projection of the 3 dimensional space onto a 2 dimensional image plane. In the image plane, the X coordinate axis is axis 700x and the Y coordinate axis is axis 700y. The stick figure model is taken as facing outwardly from the plane of the drawing of FIG. 7, and has the following parts: lower left leg 702 coupled to upper leg 704; lower right leg 706 coupled to upper right leg 708; trunk 710 coupled to both upper left leg 704 and upper right leg 708; shoulder girdle 720 coupled to trunk 710; upper left arm 714 coupled to shoulder girdle 720 and coupled to lower left arm 712; upper right arm 718 coupled to both shoulder girdle 720 and lower right arm 716; head 722 coupled to both trunk 710 and shoulder girdle 720 at point 730.

The position of the stick figure relative to the coordinate axes 700x and 700y is specified by coordinate X1 732 and by coordinate Y1 734, the coordinates X1 and Y1 specifying the position of the point 730 of junction of the trunk, the shoulder girdle and the head. Angles in the plane of image 700 are used to define the configuration of the stick figure model, and length values are assigned to each stick component of the stick figure. The angles change as the figure takes on different positions, and the lengths of the stick components change as the human being modeled rotates in 3 dimensional space. When the part of the human's body represented by a stick component is parallel to the plane of image 700, the stick component takes on its maximum length, and as the body part rotates more into a plane perpendicular (not shown) to the plane of the image 700, the stick component becomes shorter according to the rules of geometric projection.

Angles used to define the configuration of the stick figure model are as follows. Angle A1 704 represents the left knee, and is between the left upper leg 704 and the lower left leg 702. Angle A2 represents the right knee and is between the right upper leg 708 and the right lower leg 706. Angle A3 represents the left hip and is between the trunk 710 and the left upper leg 704. Angle A4 represents the right hip and is between the trunk 710 and the right upper leg 708. Angle A7 represents the angle between the trunk 710 and the shoulder girdle 720. Angle A8 represents the angle between the shoulder girdle 720 and the left upper arm 714. Angle A5 represents the left elbow angle between the left upper arm 714 and the left lower arm 712. Angle A9 represents the angle between the shoulder girdle A8 and the right upper arm 718. Angle A6 represents the right elbow angle between the right upper arm 718 and the right lower arm 716. Angle A9 represents the neck angle, the angle between the trunk 710 and the head 722.

The length of each of the stick model components is referred to using the notation of "-L" following the reference numeral identifying the stick model component. The length notations are not shown in FIG. 7. The length of left lower leg 702 is represented as 702-L; the length of the upper left leg is represented as 704-L; the length of the lower right leg is represented as 706-L; the length of the right upper leg is represented as 708-L; the length of shoulder girdle 720 is represented as 720-L; the length of the left upper arm is represented as 714-L; the length of left lower arm is represented as 712-L; the length of right upper arm is represented as 718-L; the length of right lower arm is represented as 716-L; the length of head 722 is represented as 722-L, etc. As noted above, the lengths of the stick figure components can change as the human body parts being modeled rotate in three (3) dimensional space to positions more parallel or more perpendicular to the plane of image 700, according to the rules of geometric projection.

Figure 8:
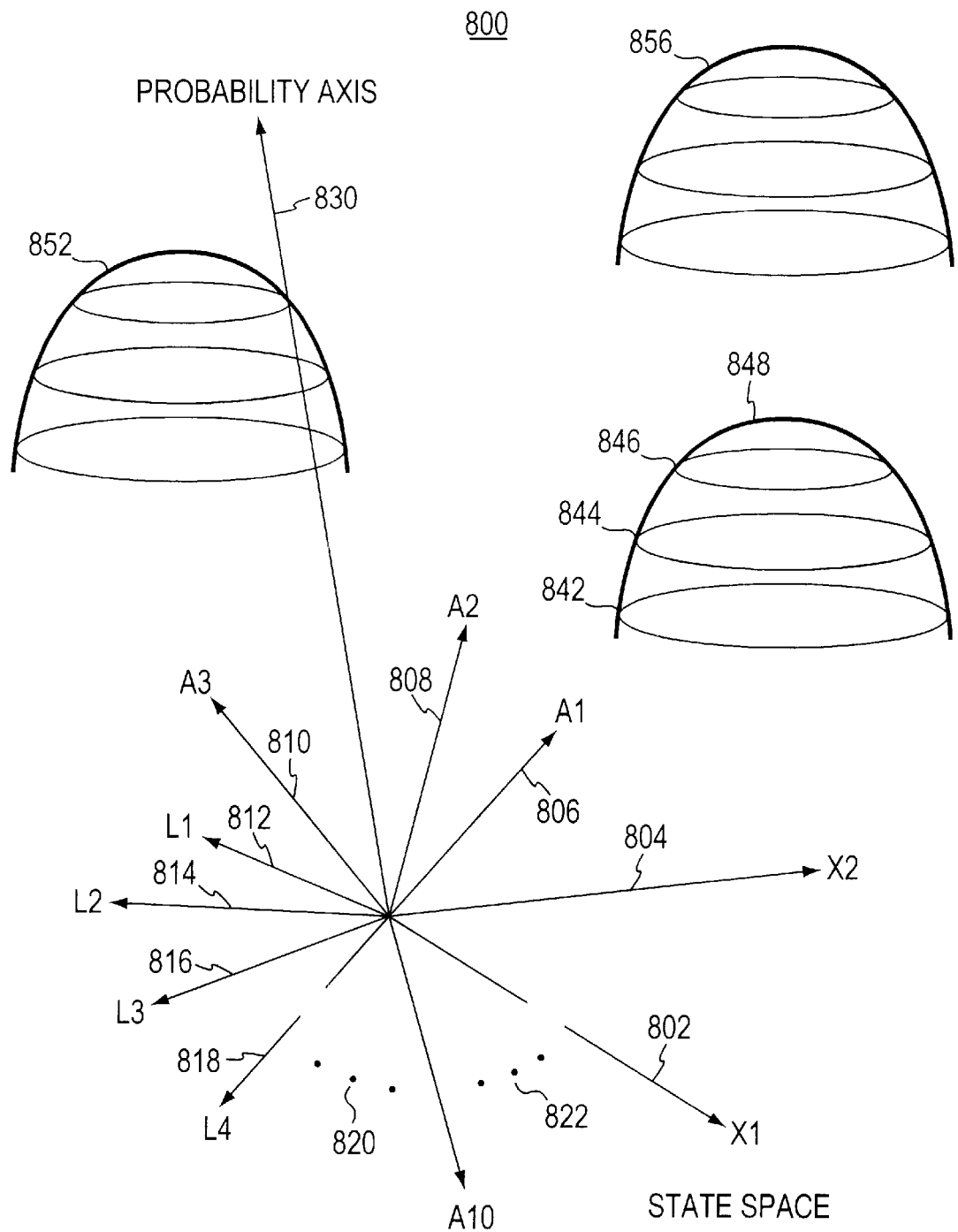
FIG. 8 is a state space diagram with a probability axis for a human figure.

FIG. 8 represents a state space 800. The state space has a dimension for each variable required to define the model. The likelihood function p(z|x), is computed from Equation 1. For example, in the stick figure model of a human given in FIG. 7 the following variables are used to define the configuration of the model: angles A1, A2, A3, A4, A5, A6, A7, A8, A9, and A10; lengths 702-L, 704-L, 706-L, 708-L, 710-L, 720-L, 714-L, 712-L, 718-L, 716-L, and 722-L; and coordinates X1 732 and Y1 734; for a total number of coordinates of twenty three (23) variables. Accordingly, state space 960 has twenty four (24) dimensions, one dimension for each of the variables plus one dimension for the probability that a state describes the image being modeled.

The state variables are shown in FIG. 8 as an axis for each variable, for example: axis 802 for coordinate X1; axis 804 for coordinate Y1; axis 806 for angle A1; axis 808 for angle A2; axis 810 for angle A3; axis 812 for length L1 for 702-L the length of lower leg 702; axis 814 for length L2 for 704-L, the length of upper left leg 704; and so forth for an axis corresponding to each of the state variables of the stick figure of FIG. 7; and finally a probability axis 830 for the computed probability. The state is specified by assigning values to the 23 variables from which a computed image is constructed. The state of the model is completely assigned at each point of state space 800, because each point corresponds to an assignment of values to the 23 variables. The value of the probability that the state corresponding to a point in state space 800 agrees with the image made from the physical data is then computed using Equation 1. A point is then plotted in state space, where the coordinates in state space are given by the 23 assigned values of the variables, along with the computed probability that the state given by the point corresponds to the image created from the physical data.

A numerical search for the maxima in the probability density function given by Equation 1 is then begun, as described with reference to the flow chart of FIG. 6. After the maxima are found by a numerical search as shown at block 612, a kernel function is fit to the probability density function as shown at block 614. In an exemplary embodiment of the invention, Picewise Gaussian functions are used as kernel functions, and three (3) kernel functions 848, 852, 856 are shown. Each kernel function 848, 852, 856 has been fit numerically to the likelihood function p(z|x) of Equation 1 at a peak in the likelihood function.

Figure 9:
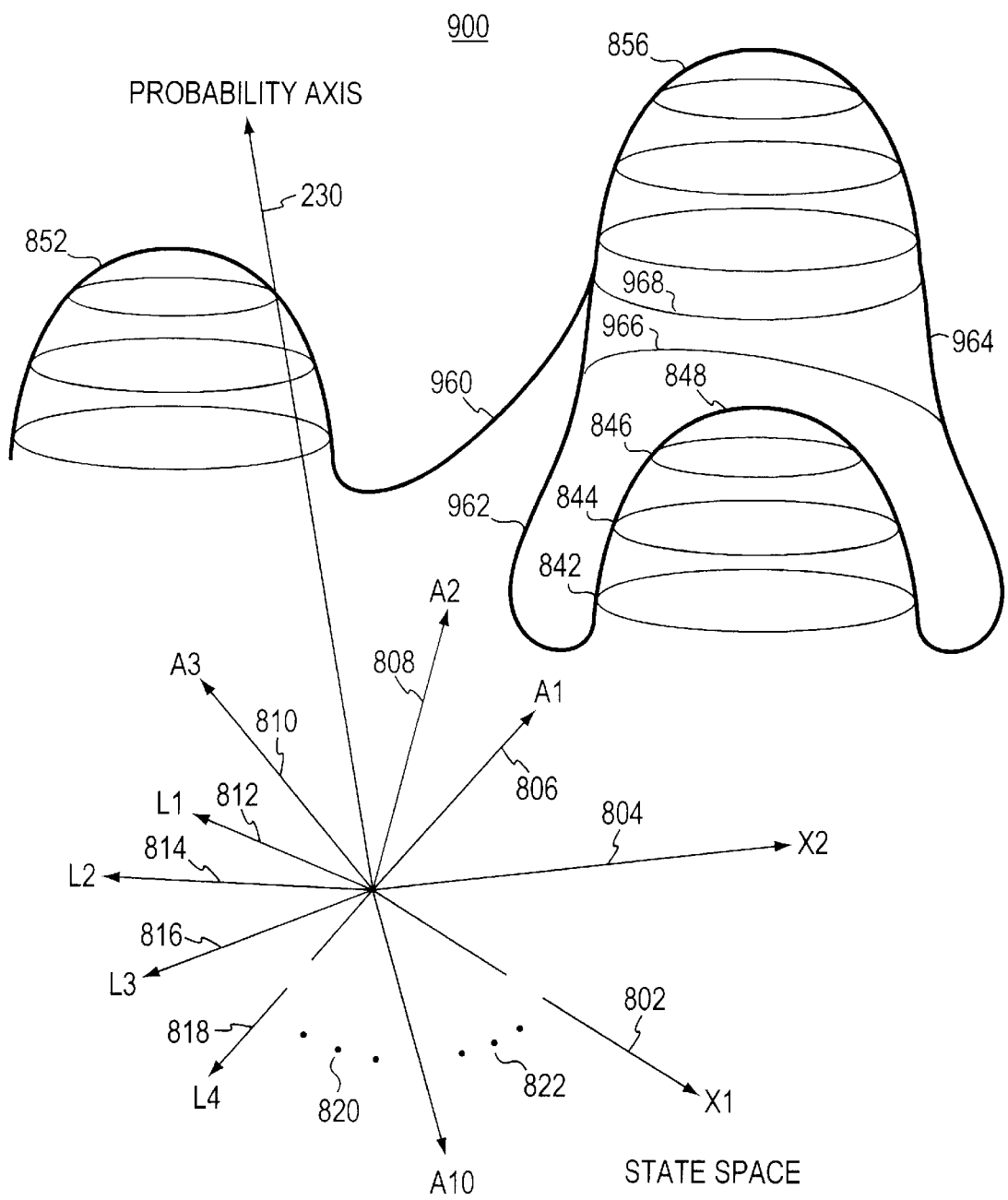
FIG. 9 is a state space diagram with a probability axis for a human figure.

Turning now to FIG. 9, curves of computed probability joining the local best fit Gaussian kernel functions are shown as curve 962 and curve 964 joining local Gaussian kernel 848 and local Gaussian kernel 856. Also curve 960 is shown joining local Gaussian kernel 852 to the other local Gaussian kernels 848 and 856. The surface of probability plotted along probability axis 830 is complicated in that it exists in a 24 dimensional space, and only curves 962, 964, and 960 are used in FIG. 9.

Figure 10:
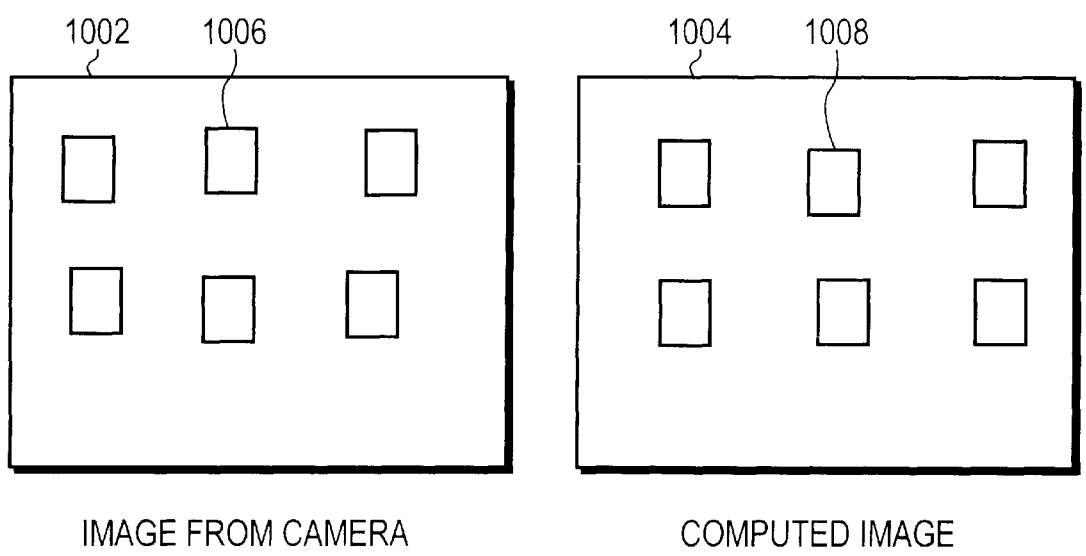
FIG. 10 is block drawing of an image from data and a predicted image.

Turning now to FIG. 10 there is shown image 1002 created from physical data. For example, image 1002 can be a frame from a sequence of television frames. Or, for example, image 1002 can be one frame from a photographic movie film, or image 1002 can be a presentation on a cathode ray screen of radar data collected during air traffic control operations, or further, image 1002 can be a presentation in a military viewer showing a target for the purpose of aiming a weapon at the target, etc. In all cases, image 1002 is presented as discrete pixels 1006. Pixels 1006, may for example, be black and white presentations with a scale of gray with a chosen number of levels of scale of gray, such as 8 levels, 16 levels, 32 levels, etc. Alternatively, pixels 1006 may be color representations of an image, and can have a number of bits assigned in each pixel for the representation of primary colors in order to generate a color image on a television screen, a computer screen, etc.

Image 1004 is computed from a model of a target as is represented by state space 800. Image 1004 is also presented as pixels, such as pixel 1008. In FIG. 10, pixel 1008 is taken as the computed pixel corresponding to pixel 1006 of the physical image 1002. The number of pixels in an image depends upon the technology used in creating the physical image 1002. For example, a television image could be represented by 1000 pixels horizontally and 800 pixels vertically, with details depending upon the video protocol employed. With a 200 by 300 pixel image, there will be 60,000 pixels in the image. For example a NTSC video image may be digitized into a picture of approximately 200 by 300 pixels. Alternatively, higher resolution can be achieved by using more pixels, for example a 400 by 600 pixel image, leading to a total of 240,000 pixels in the image. Further, a digital television camera may record the image directly in pixels, with the number of pixels depending upon the number of discrete detectors in the camera, for example the number of detectors in a charge sensitive imaging device. The difference in values between pixels 1006 in the physical image and pixel 1008 in the computed image is used as a value in computing the probability that the point in state space 800 represents the image in physical image 1002.

The sum indicated in Equation 1 is taken over all pixels (60,000 pixels in a full 200 by 300 pixel image) in the event that the image is analyzed as a whole. Alternatively, a smaller analysis window may be defined, and in that event the sum is taken over the pixels within the analysis window.

In accordance with the invention, the plurality of Gaussian approximations at the hypothesis points in state space are then combined to form a Piecewise Gaussian (PWG) representation of the probability density p(X) in state space 800.

$$p(x) = k \max_{i=1,...N} \{p_i \exp(-1/2(x - m_i)^T S_i^{-1}(x - m_i))\} \qquad \text{Eq. 4}$$

N is the number of hypothesis points. The symbol "S" represents the covariance matrix of the Gaussian functions.

Figure 11:
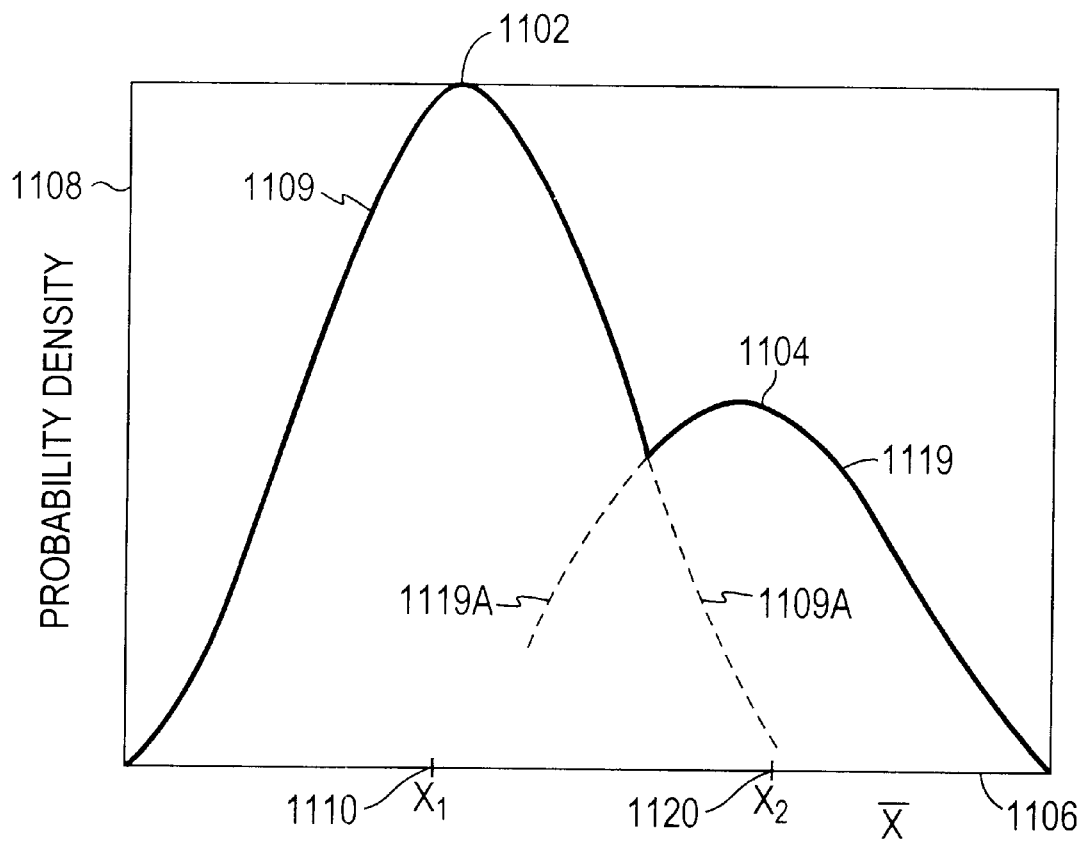
FIG. 11 is a graph showing a probability density function in accordance with the invention.

FIG. 11 represents a probability density function with two peaks, peak 1102 and peak 1104, and its representation by a Picewise Gaussian function as indicated in Equation 3. The state space dimension is plotted along the horizontal axis 1106. The probability density function is plotted along the vertical axis 1108. Point $x_1$ 1110 is the mean for Gaussian 1109, 1109 A. Point $x_2$ 1120 is the mean for Gaussian 119, 1119A. The means $x_1$ and $x_2$ and the variances $\sigma_1$ and $\sigma_2$ (not shown) are computed from the procedure for fitting Gaussian functions to numerical values of p(z|x) as given by Equation 1.

Standard regression techniques are used to fit Gaussian approximations to the peaks of the likelihood function. These fits yield approximate kernel functions for the likelihood function. For example, only one approximation Gaussian function may be fit to the likelihood function when it is desired to determine the approximate region and width in state space where the peaks are located. Other desirable results are obtained by fitting Gaussian functions to the highest peaks, or to the otherwise chosen best peaks in order to approximate kernel functions for the likelihood function.

Successive Frames

Ordinarily, a sequence of frames of data are taken, and the requirement is to track the object represented by the model as the objects move during time when they were observed. For example, in a television reproduction of a scene using National Television Standards Committee (NTSC) format, there will be 30 images per second produced. The sequence of processing steps shown with reference to the flow chart of FIG. 6 is then applied to each frame of data.

Figure 12A:
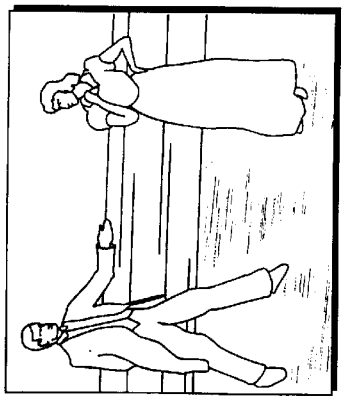
FIGS. 12A, 12B, 12C, and 12D are a sequence from a video recording showing motion of a figure in the scene.
Figure 12B:
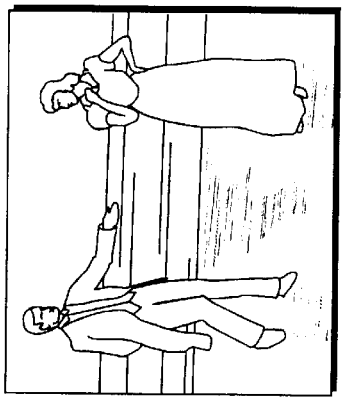
Figure 12C:
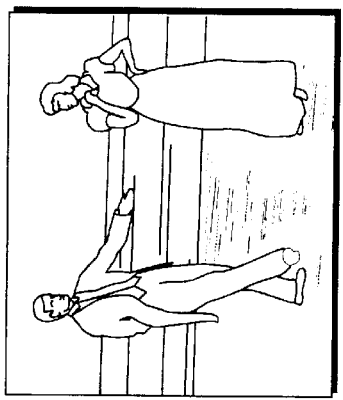
Figure 12D:
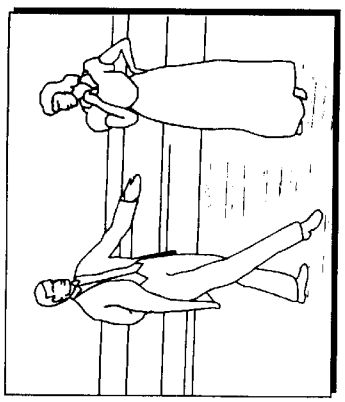

FIGS. 12A, 12B and 12C show a sequence of frames from a photographic film. The film was first converted to a video tape, and the video tape was digitized for processing in a computer. In progressing from FIG. 12A through FIG. 12D, the man dances across the scene while moving his arms.

Figure 13A:
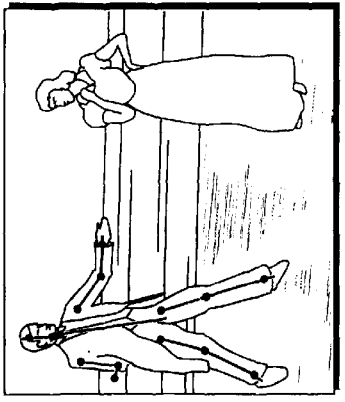
FIGS. 13A, 13B, 13C, and 13D showing tracking of a figure from FIGS. 11A–11D, showing errors in tracking due to occlusion of one part of the figure with another as done in the prior art.
Figure 13B:
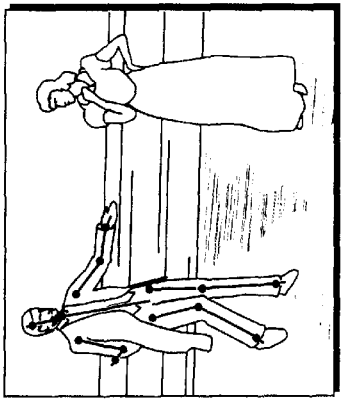
Figure 13C:
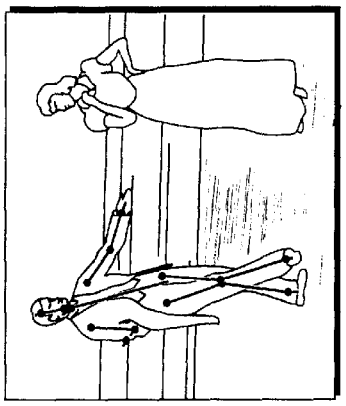
Figure 13D:
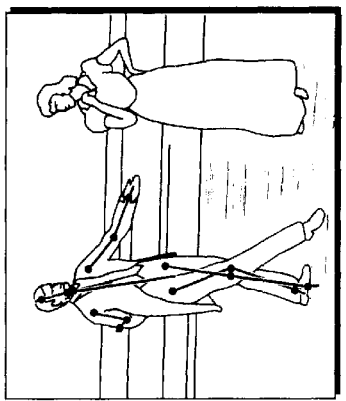

FIGS. 13A, 13B, 13C show the stick model as computed in accordance with prior art methods which do not allow multiple hypothesis. In the frame of FIG. 13C, the man's knees occlude each other. The tracking process makes an error in frame of FIG. 13D and shows an erroneous stick model.

Figure 14D:
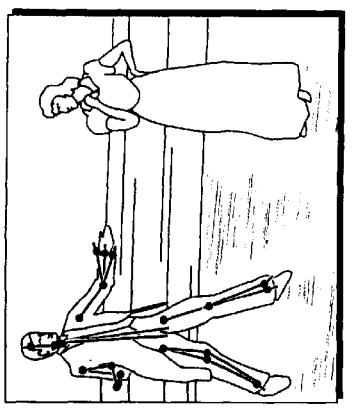
FIGS. 14A, 14B, 14C, and 14D showing tracking of a figure from FIGS. 11A–11D using multiple state space points to model the objects, in accordance with the invention, and including uncertainty in the prediction.
Figure 14C:
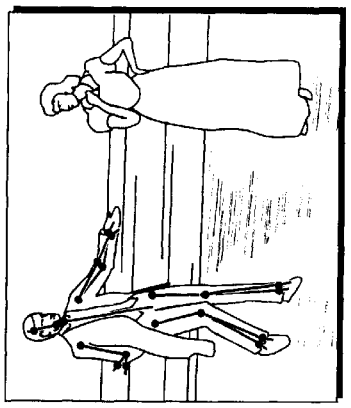
Figure 14B:
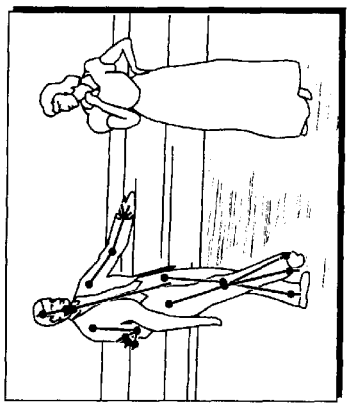
Figure 14A:
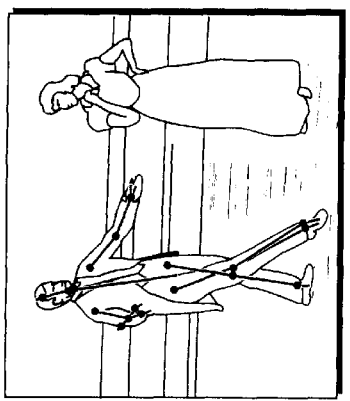

FIGS. 14A, 14B, 14C, 14D show analysis of the sequence of images in accordance with the invention. In FIG. 14C the occlusion of the knees results in several substantially equally good (equally probable) hypothesis to explain the data. The multiple hypothesis are shown as several stick figure representations of the man's lower legs. FIG. 14D shows evolution of the motion into a future frame relative to FIG. 14C, and shows how the present invention resolves the ambiguity of FIG. 14C as the probability of the "best" mode remains large in the subsequent data frames, while "wrong" modes give low probabilities and are discarded as the subsequent frames are analyzed.

Figure 15A:
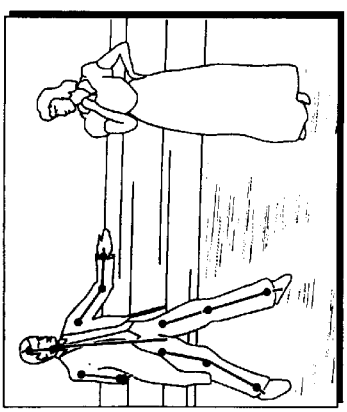
FIGS. 15A, 15B, 15C, and 15D showing tracking of a figure from FIGS. 11A–11D using multiple state space points to model the objects, in accordance with the invention.
Figure 15B:
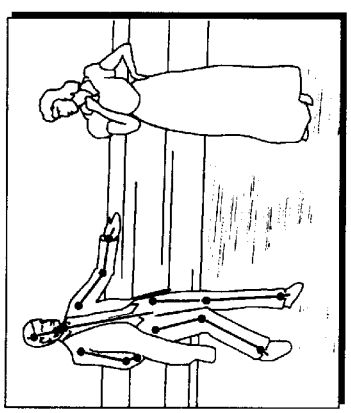
Figure 15C:
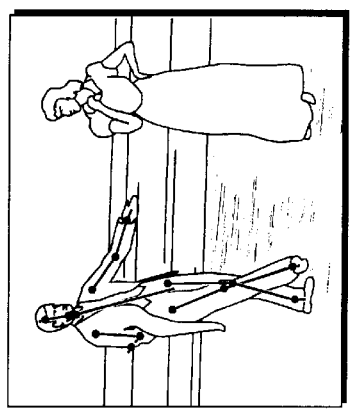
Figure 15D:
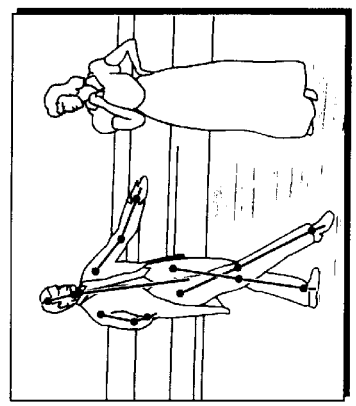

FIGS. 15A, 15B, 15C, 15D show a reconstruction of the motion using the mode determined from frame of FIG. 15D in order to resolve the ambiguous result of FIG. 14C. The correct stick model representation of the figure is obtained for the frame of FIG. 14C.

Figure 16:
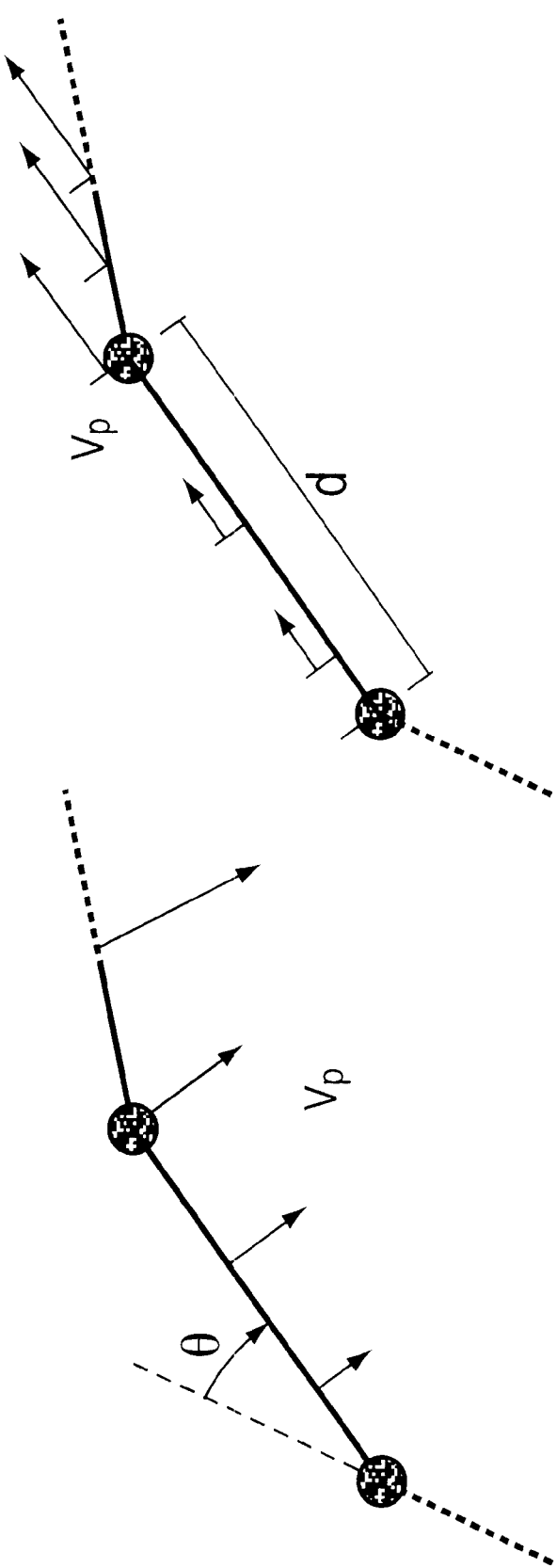
FIG. 16 is a vector diagram of a constant velocity predictor for tracking a human figure, in accordance with the invention.

FIG. 16 is a constant velocity predictor model of the type used in block 606 and Step 2 above for use with a stick model for a human figure in the exemplary embodiment of the invention as shown in FIGS. 12–15. The model is a scaled prismatic model (SPM). The model enforces 2D constraints on figure motion that are consistent with an underlying 3D kinematic model. Each link in a scaled prismatic model describes the image plane appearance of an associated rigid link in an underlying 3D kinematic chain. Each SPM link can rotate and translate in the image plane as illustrated in FIG. 16. The link rotates at its joint center around an axis which is perpendicular to the image plane. This rotation captures the effect on link orientation of an arbitrary number of revolute joints in the 3D model. The translational degree of freedom (DOF) models the distance between the joint centers of adjacent links. The DOF captures the foreshortening that occurs when 3D links rotate into and out of the image plane. This DOF is called a scaled prismatic joint because in addition to translating the joint centers it also scales the template representation of the link appearance. The effect of revolute (angular θ) and prismatic (length d) DOF's on one link from a 2D SPM chain is shown in FIG. 16. The arrows show the instantaneous velocity of points along the link due to an instantaneous state change as the images progress along the sequence of images. Each link in the arms, legs, and head is modeled as an SPM link. Each link has two degrees of freedom, leading to a total body model with 19 DOF's. The tracking problem consists of estimating a vector of SPM parameters for the figure in each frame of a video sequence, given an initial state. The initial state is given by a person selecting a "good" fit of a model to an image, using a manual placement of the model on the image.

Figure 17:
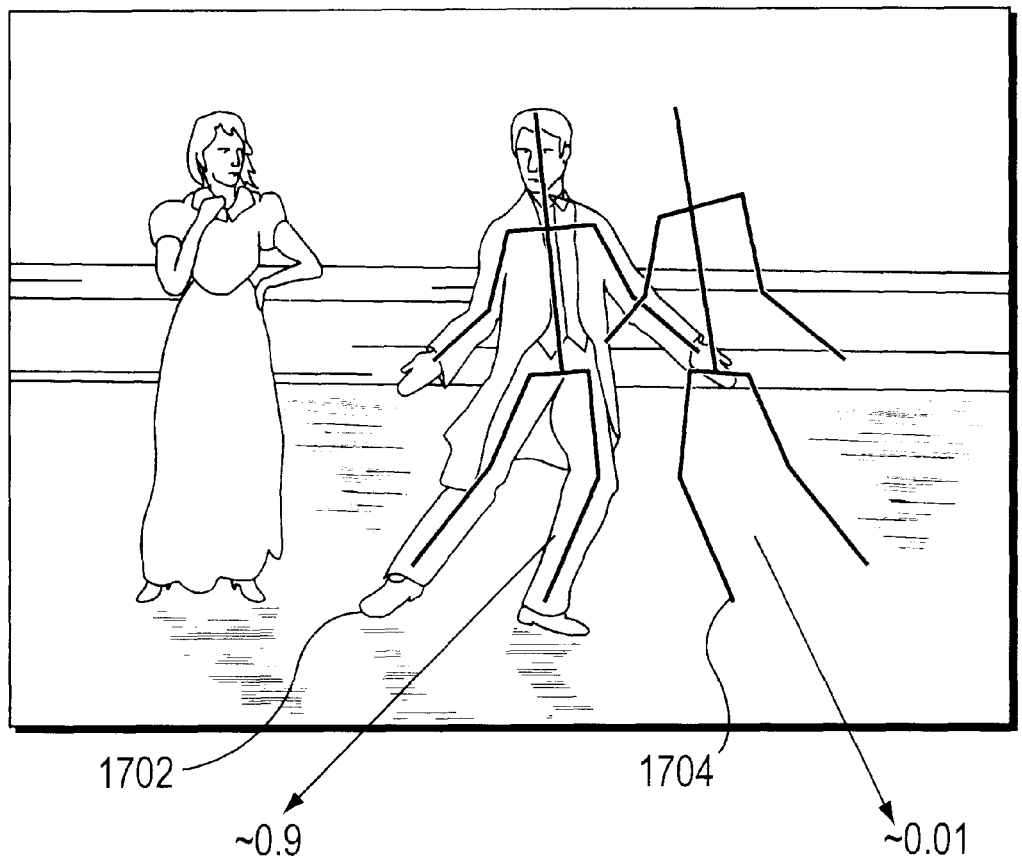
FIG. 17 is an image showing a model with high probability and a model with low probability, in accordance with the invention.

FIG. 17 gives representative values of the probability density function for fits of the model to a figure such as shown in FIGS. 12–15. When the model 1702 is properly superimposed on the image of the man, the probability density function gives a value of approximately 0.9. When the model 1704 is displaced from the figure, the probability density function drops in value to approximately 0.01. By following multiple modes of the probability density function from frame to frame, the invention resolves ambiguities in the image data, and provides a good solution to the tracking problem.

Second Exemplary Embodiment, of One Image

Generally, Sequential Markov Decision Processes can be evaluated by the teachings of the invention. In Sequential Markov Decision Processes a sequence of different measurement processes are applied to a set of data. According to the teachings of the invention, the peaks of the probability density function of Equation 1 can be used to select a set of seed points for the numerical search of Equation 1 for the next measurement process. The block diagram shown in FIG. 3 also represents this case.

Also, the method of the invention using a kernel-based density estimation method may be applied to analysis of one frame of data and one measurement process. Again, The block diagram shown in FIG. 3 represents this case.

As a first example, detection and reading of an automobile license plate may be improved by use of the invention. An automobile passing through a collection booth on a highway or bridge, etc., may have a photograph (or video frame, etc.) taken of the vehicle in the event that the driver does not toss the proper coins into the toll collection machine.

Or a camera may be aimed at a traffic junction, and a single image may be obtained of the automobile. The camera may be triggered by pressure pads on the roads which are active during the time intervals when the associated traffic lights are red. The setup is intended to record images of the license plates of cars which are driven through a red stop signal (assuming no turns are allowed). In both of these examples, it is desired to determine the number of the license plate. The difficulty in reading the license plate numbers is that there is some ambiguity as to the image location of the license plate because cars have different shapes, license plates are mounted differently on different models, and the different cars may be in different locations in the photograph because cars travel at different speeds.

The state-space in this exemplary embodiment of the invention is identical to the image coordinate space and the estimator state x represents the estimated position of the license plate in the image. The sensor is the camera and generates an image z.

In the block diagram of FIG. 3, the prediction module is used to generate a prior probability distribution p(x) for the state of the estimator before making any observations. The prior distribution in this instance may be an elongated Gaussian centered on the middle of the junction with its major axis aligned along the direction of the road.

Based on the prior distribution, a set of random seeds are obtained which are used to specify the locations of local search windows in the image. A search may then be carried out within each window by correlating the regions within the window with a template of a typical license plate. The image positions which have peak correlation scores within each search window represent separate hypotheses for the position of the license plate.

Because of variation in the appearances of license plates as well as different lighting conditions, it is impossible to determine exactly if an image region represents a license plate. Instead the correlation score at each hypothesis may be used to compute a probability that the corresponding image region represents a license plate. Furthermore as the correlation score is likely to be smoothly varying in the neighborhood of the hypothesis, kernels can be used to express the local probability density around each hypothesis. The likelihood distribution p(z|x) is thus approximated by a set of kernels surrounding each hypothesis in state-space.

Finally, the posterior distribution p(z|x) may be computed using Bayes' Equation by multiplying the prior and likelihood distributions. This would have the effect of reducing the probability of hypotheses located in parts of the image which are apriori known to be unlikely, e.g., a hypothesis corresponding to a road sign (with similar appearance to a license plate) but which is located on the curb and distant from the center of the traffic junction. On the other hand, hypotheses located near the mode of the prior distribution will have enhanced probability. Note that because this is a static estimation problem, the posterior estimation module is the final process of the method and the posterior distribution is not recursively fed into the prediction module.

Once the posterior distribution has been obtained, we may wish to consider how this can be further used in the example scenario. One possibility is that the posterior distribution and captured image can be used as inputs into a license plate recognition phase which only operates on image regions identified by the strong posterior modes. The recognition module may have database of license plate numbers which would provide greater capability of eliminating the false hypotheses, but which would also invoke a greater computational cost. The license plate detection phase therefore serves to reduce the operation time between image capture and license plate recognition.

Further, the invention permits a convenient analysis of a single set of data using a sequence of different methods of analysis. Each method of analysis uses its own model of the data. However, by employing Equation 1, a first crude model can find the regions of high probability in state space for obtaining a fit. A random Gaussian distribution, or other convenient random functional method, can then be used to select seed points which cluster around the peaks in the probability density of Equation 1, and the seed points provide starting points for conducting a numerical search for the peaks when Equation 1 is evaluated for the next model. A sequence of different measurement processes can then be applied to a single set of data by the teachings of the invention.

The model may have multiple steps, such as: the first model is to look for the location of the license plate, then use peaks in the likelihood function of Equation 1 as hypothesis points to develop seed points for searching for numbers; second, the seed points are used with a model of numbers to search for the license plate number; and, further, iterate for several cycles until the numbers of the license plate are read from the image. The number is then compared with a database of license numbers. By following multiple peaks in the likelihood function, This example illustrates a single set of data subjected to a sequence of different measurement processes.

As a second example, an image (photograph, video frame, etc.) may contain a face. It is desired to locate the face in the image, and to fit a model to the face. Again, a sequence of analysis steps is applied to the image. Equation 1 is evaluated for the image with a model being an oval outline so that regions of the image having high probability of recording a face will produce peaks in the probability density function of Equation 1, and these peaks, or hypothesis points, are used to generate seed points for a second method of analysis. Secondly, a model representing skin color can be used, especially in a color image, to more specifically locate a face, using the seed points from the analysis based on a simple shape such as an oval. Third, a model of skin texture can be used to more specifically locate a face, and the seed points selected from the peaks of the earlier model provide starting points for the next model. Fourth, a model having more detail such as eyes, nose, mouth, etc. is used in Equation 1, using as seed points the peaks from the last analysis. Succeeding steps of analysis can then fit features of increasing detail to the image at locations having high probability for reproducing a face, and each step produces hypothesis points which provide seed points for the next round of analysis. Again, this example illustrates a single set of data subjected to a sequence of different measurement processes.

Third Exemplary Embodiment, Sequential Markov Decision Problems

Many practical multimedia and image processing applications take the form of applying a series of operations on a fixed set of measurement data to estimate a desired result. For example, in the problem of face detection the goal is to identify all of the pixel regions in a single image that contain a face. There are a variety of operations that can be used to detect the presence of a face, including detecting skin color, skin and hair texture, the existence of facial features such as eyes and mouth, as well as template matching the overall pixel pattern of the face itself.

In these applications, it is often desirable to perform these processing operations in a certain order, and it is desirable to propagate the estimated state information across this sequence of operations. In the face detection example, operators such as skin color detection have a computational cost which is orders of magnitude lower than high level operations like template matching. It is desirable to apply the operators in order of increasing computational cost and use the updated state information to determine the most promising parts of the data set on which to apply the more expensive operators.

In the face detection example, the estimated state consists of the position, orientation, etc. of a candidate face location in the input image. This can be formally defined as a transformation between a canonical face template and the image coordinates. A representative example transformation is an affine transform. This transformation is illustrated, for example, in FIG. 18 and FIG. 19. Image 18,002 has two views of a face, a front view 18,004, and a side view 18,006. A reference face 18,010 is defined by a model.

Figure 19:
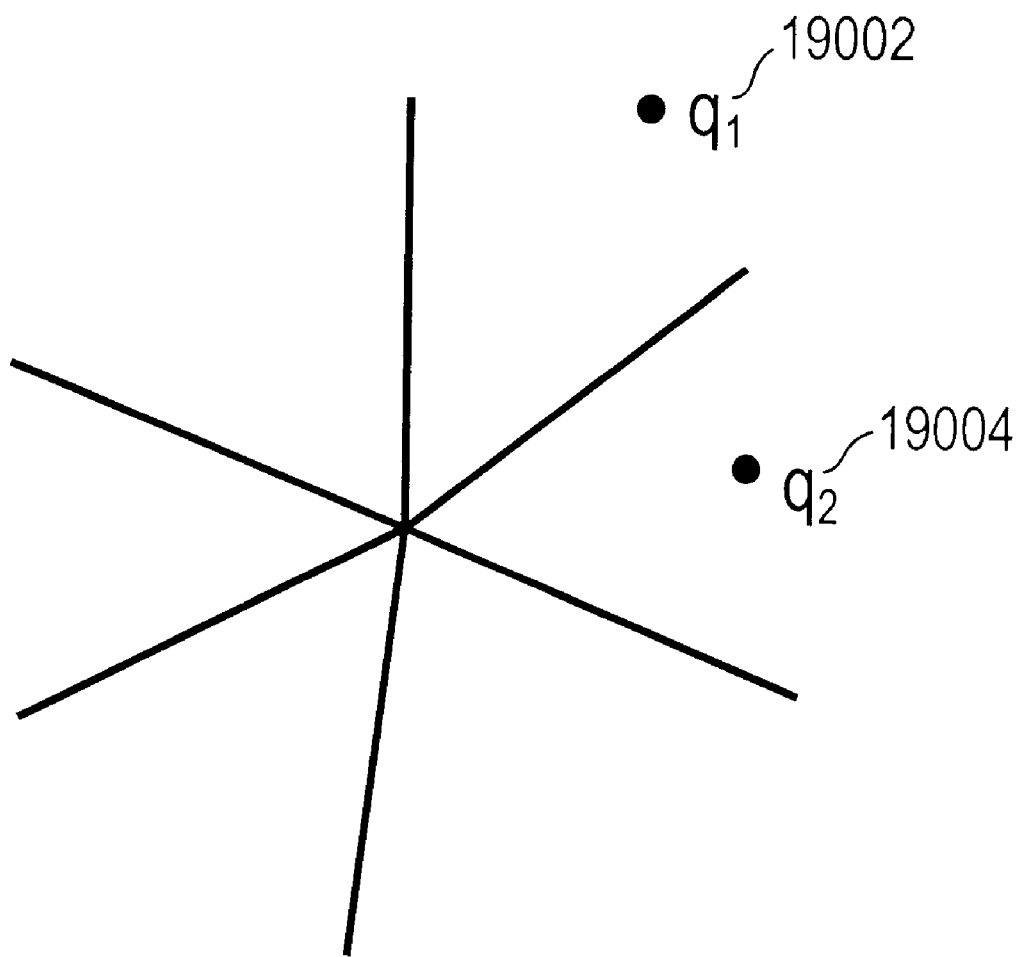
FIG. 19 is a representation of state space for the example shown in FIG. 18.

The transformation 18,020 between the reference face 18,010 and the front view 18,002 of a face in image 18,002 refers to a point $q_1$ in state space, where state space is shown in FIG. 19. The transformation 18,022 between reference face 18,010 and the side view 18,006 of a face in image 18,002 refers to point $q_2$ of the state space shown in FIG. 19.

Figure 18:
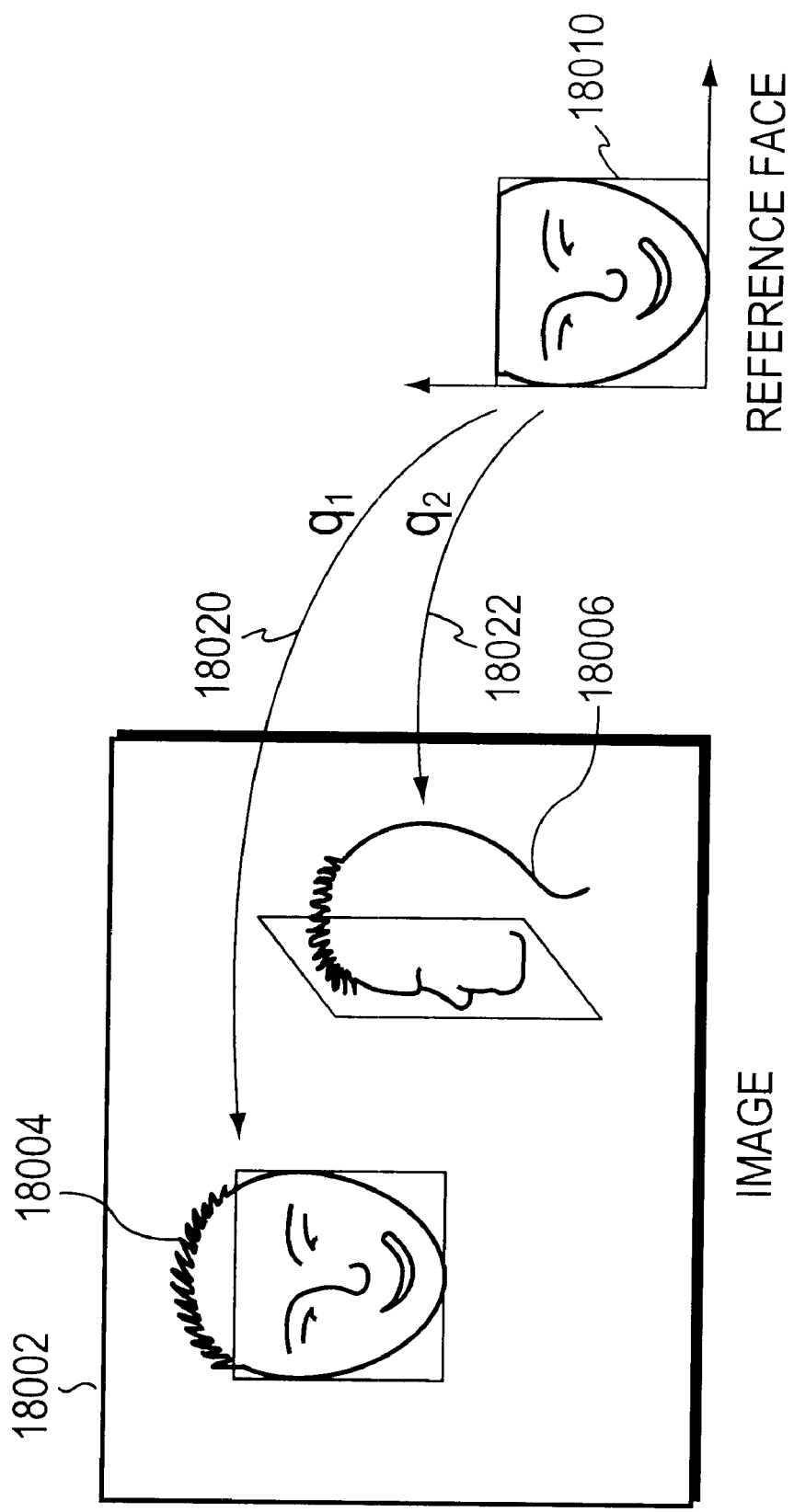
FIG. 18 is a block diagram depicting a transformation between an image and a model.

Turning now to FIG. 19, state space 19,000 for the image analysis of FIG. 18 is shown. Two points, $q_1$ 19,002 and $q_2$ 19,004 are shown. The location of point $q_1$ 19,002 in state space 19,000 defines a face in a front view. The location of point $q_2$ 19,004 in state space 19,000 defines a face in a side view.

Figure 20:
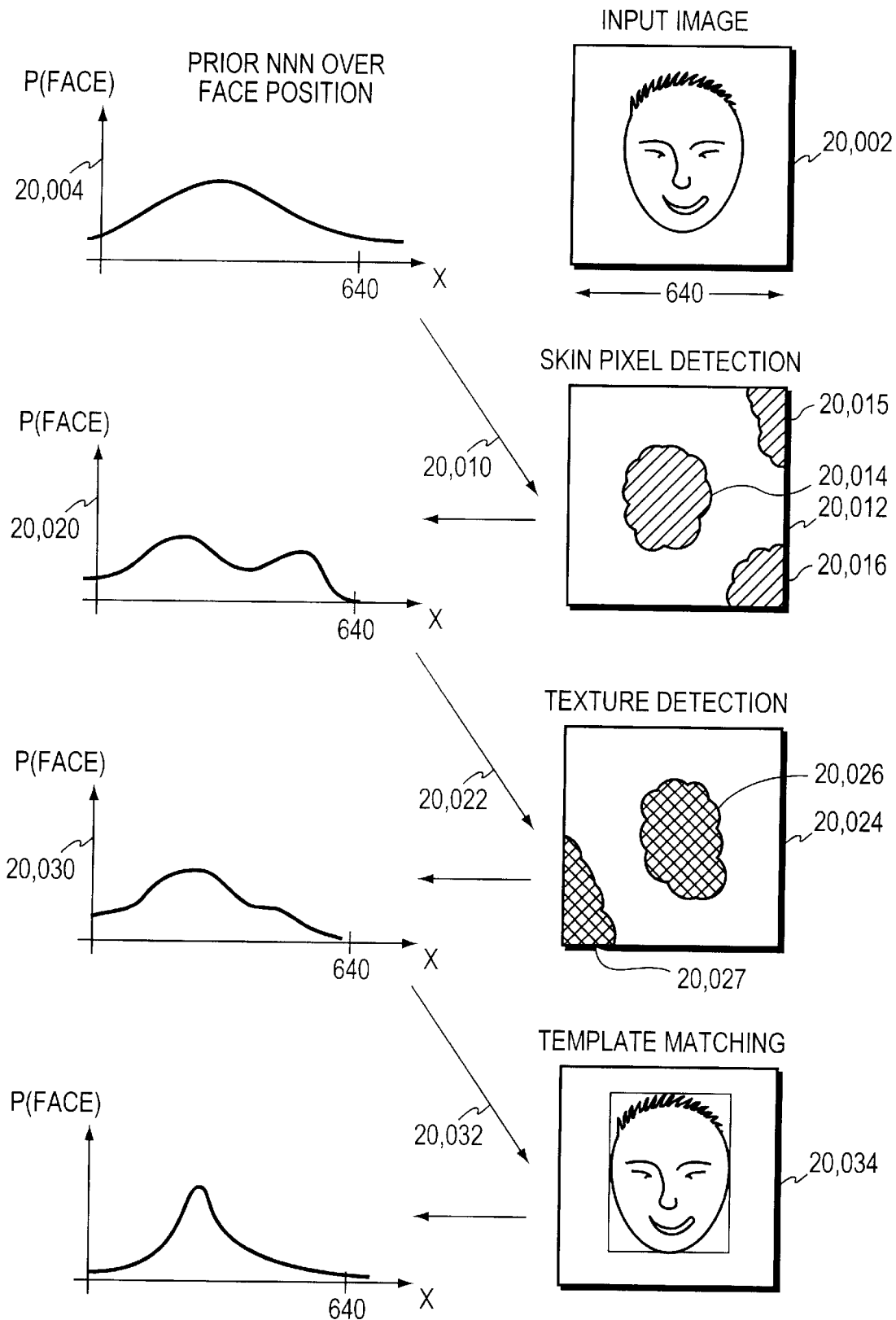
FIG. 20 is a block diagram depicting a sequence of analyses in accordance with the invention.

The state information can be represented probablistically as a density function over the transformational state space, as shown in FIG. 20. The key technical problem is then how to update and propagate this density function through a series of measurement steps, also as shown in FIG. 20. This key technical problem is solved by propagating multiple seed points based upon a random distribution centered upon the multiple modes of a prior probability distribution, and performing a numerical search from the seed points in order to locate the peaks in a likelihood function calculated as illustrated in Equation 1.

The image input data is shown as image 20,002. A prior probability distribution function 20,004 is applied to the data of image 20,002. Prior probability distribution function 20,004 is a smooth function with a broad peak centered on the center of image 20,002. For example, in an exemplary embodiment of the invention, a Gaussian function centered on the image 20,002 and extending broadly over the entire image may be used as prior probability distribution function 20,004.

A first analysis 20,010 using a skin detection model which examines each pixel, when applied to prior probability distribution 20,004 gives rise to a multimode likelihood function, and a presentation in the image space of that multimode likelihood function is shown in block 20,012. Block represents three regions of high probability for the location of a face, region 20,014, region 20,015, and region 20,016. A new prior probability distribution function 20,020 is then computed from likelihood function giving rise to image 20,012.

Prior probability distribution function 20,020 serves as input to a texture detection analysis 20,022 using a pixel by pixel texture detection model. The result is a likelihood function based upon the texture analysis 20,022, and an image based upon this likelihood function is shown in block 20,024. Image 20,024 shows two regions having high probability of representing a face, based upon analysis 20,022, and they are regions 20,026 and regions 20,027. From the likelihood function giving rise to image 20,024, a new prior probability function 20,030 is computed. The prior probability function 20,030 serves as input to a template matching analysis 20,032. The model resulting from calculation of a likelihood function is shown as an image at block 20,034. The template matching analysis 20,032 is based on the preceding likelihood analyses 20,010 and 20,022, as well as the template matching analysis 20,032 in accordance with the invention. The use of random distributed seed points centered on the modes of succeeding likelihood functions computed as illustrated in Equation 1 provides an efficient computational path from the data of an image as illustrated in block 20,002 through the result of a template analysis as illustrated in block 20,034.

The face detection example is an instance of a larger class of what are called Markov decision problems, which involve updating a probability distribution through a series of measurement or sensing operations. Other sample applications include remote sensing, such as satellite imaging of the earth's surface. Here the sensor itself can be focused at a wide range of resolutions and aimed at different locations on the earth's surface. It outputs data over a broad range of frequency bands, from infrared to ultraviolet. Since it is impossible to process all of this data at a high resolution, the goal is to apply a series of processing operations to determine which portions of the data are most likely to contain features of interest.

The challenge in many of these applications is that the probability density function over the state space for objects of interest is multimodal. In the image of FIG. 18, for example, there are multiple locations containing faces. In a satellite image there will be multiple locations for wheat fields, multiple locations for corn fields, and so forth. Healthy crops and diseased crops have different reflectivity patterns in different wave length bands. It may be desirable to distinguish forest from savanna, and also some farm fields will be in different stages of maturity, all producing different reflectivity patterns in the infra-red and in the ultra-violet wavelengths, and as recorded by the detectors in the satellite which produce the image to be analyzed. Where the object of the analysis is to locate all such instances of a target of interest, the use of randomly distributed seed points based on multiple modes of a likelihood function as the analysis proceeds from one stage through another stage leads to an efficient path of numerical analysis.

These illustrations lead to multiple modes in the transform space that maps a canonical model to image coordinates. Thus a successful solution to the Markov decision problem in these contexts requires a computationally efficient method for representing and propagating multimodal density functions across a series of measurements.

The sequential Markov decision type of problem can be solved using the method of multiple hypothesis density function estimation as illustrated in the block diagram of FIG. 3. The prediction step 302 generates a predicted density function based on the results of a previous measurement operation. In some applications it may be possible to develop an accurate model for a given measurement operation, resulting in a useful prediction. For example, measurement operations may consist of changes in camera focus in a remote sensing application. In this case it may be possible to predict the output at one resolution given measurements obtained at a different resolution. In other applications the prediction step may not play a powerful role.

Following prediction, sampling at block 310 from the updated multimodal density function is used to generate starting points (seeds) 312 for search. The refinement step which numerically searches for modes of a likelihood function at block 320 using the set of seeds 312 involves the application of the next measurement operation in the sequence from sensors 304. The form of the likelihood function is illustrated in Equation 1. This refinement step results in a new set of detected modes which are used to update the multimodal representation. The process of fitting kernel functions and updating the posterior density using Bayes rule at block 330 closely follows the tracking application of our multiple hypothesis process.

Figure 21:
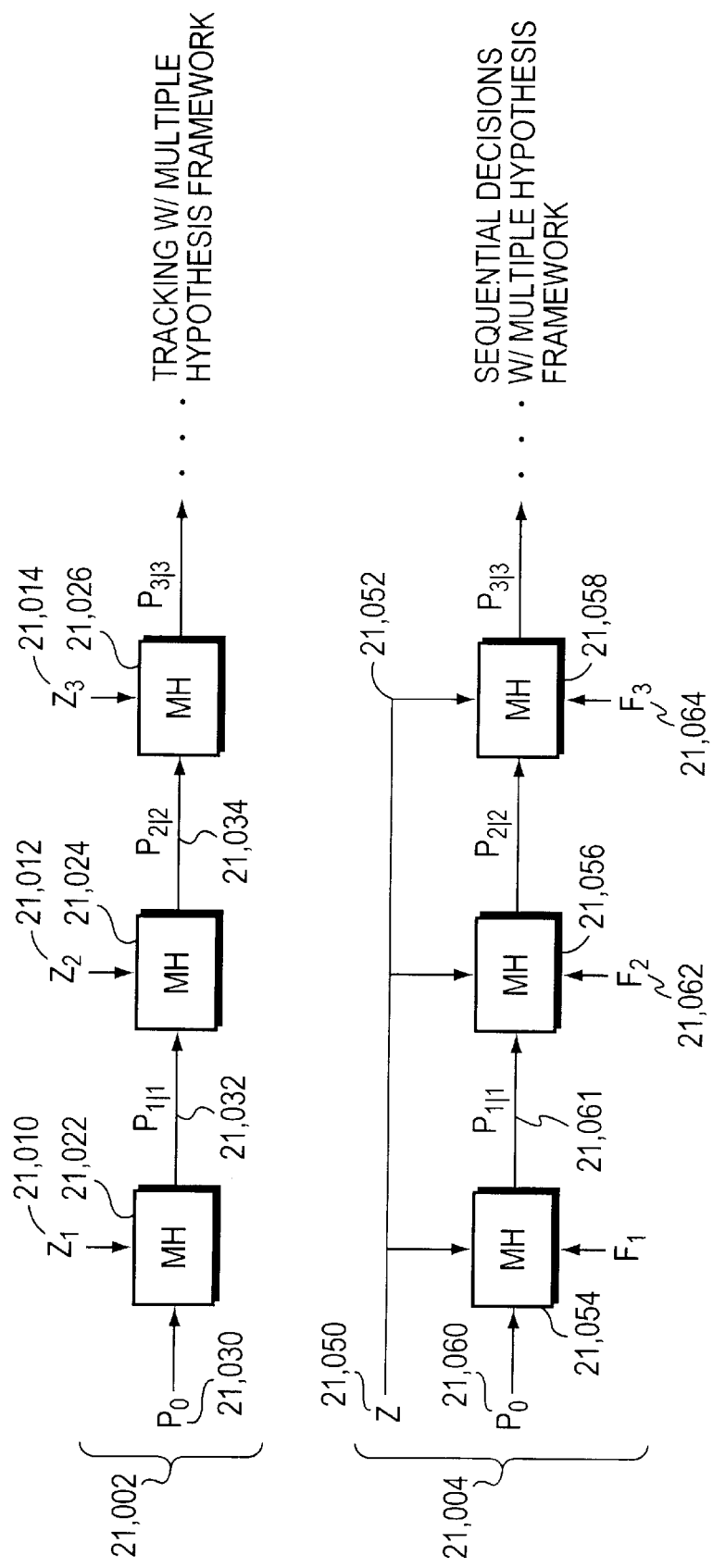
FIG. 21 is a flow chart in accordance with the invention.

FIG. 21 graphically illustrates the similarity and the differences between the tracking problem and the general sequential Markov decision problem using the multiple hypothesis method of the invention. Flow chart 21,002 illustrates the tracking problem. Flow chart 21,004 illustrates the sequential Markov decision problem.

In the tracking problem a sequence of measurements or frames of data, illustrated as frame $z_1$ 21,010, frame $z_2$ 21,012, frame $z_3$ 21,014 . . . etc. are collected by sensors 204 of FIG. 1. For example, the sensors are illustrated by a video camera which takes frames of data. The data and a prior function are fed into the multiple hypothesis computational machinery for calculation of a succession of likelihood functions, as illustrated at blocks 21,022, 21,024, and 21,026. Block 21,022 receives as input the prior function $p_0$ 21,030 and frame $z_1$ 21,010, and produces as output the new prior function $p_1/z_1$ 21,032. Likewise, block 21,024 receives as input the new prior function $p_1/z_1$ 21,032 and new frame $z_2$ 21,012, and produces as output new prior function $p_2/z_2$ 21,034, and so forth. The sequence of blocks repeats as long as frames of data are presented for analysis by the multiple hypothesis computational machinery of blocks 21,022, 21,024, 21,026, etc.

In contrast, the sequential Markov decision problem based on one frame of data is shown in flow diagram 21,004. The one frame of data is represented as z 21,050. Frame of data z 21,050 is input by line 21,052 to each of the multiple hypothesis processing blocks, block 21,054, 21,056, 21,058, and etc. The multiple hypothesis computational machinery operates in block 21,054, block 21,056, block 21,058, . . . etc. and there are as many such computational blocks as there are sequential analysis models to be applied to data frame z 21,050. For example, analysis model $F_1$ along with prior function $p_0$ are applied to data frame z 21,050 at block 21,054. Block 21,054 produces as output the new prior function $p_1/z$ 21,061. New prior function $p_1/z$ 21,061 and analysis model $F_2$ 21,062 are applied to data frame z 21,050 at block 21,056, and so forth for analysis model $F_3$ 21,064 and etc.

Figure 22:
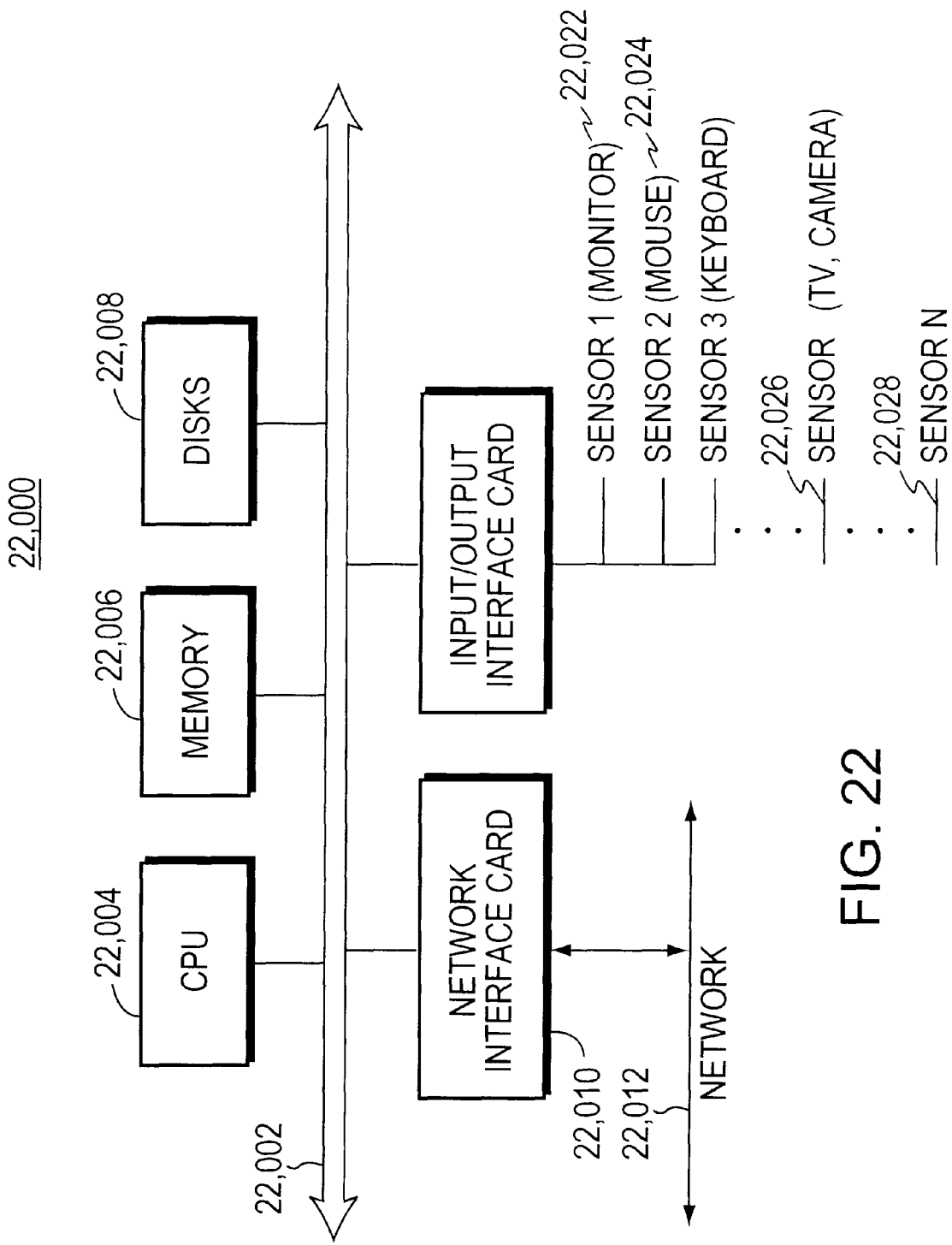
FIG. 22 is a block diagram of a computer in accordance with the invention.

FIG. 22 shows block diagram 22,000 of a computer system. Bus 22,002 provides communication between various components of the computer system. Central Processor Unit (CPU) 22,004 performs the compute functions of the computer. Memory 22,006 provides storage for both data and computer programs. CPU 22,004 is controlled by a program which resides in memory 22,006, and also CPU 22,004 reads data from and writes data into memory 22,006. Disk unit 22,008 provides long term storage for data. Disk unit 22,008 may include both hard drives mounted within the computer, and may include removable magnetic media such as floppy disks, megabyte or giga-byte high capacity removable media, and may also include tape drives. Bus 22,002 provides a communication path between the major components of the computer, including CPU 22,004, memory 22,006, and disks 22,008. Disks 22,008 may, depending upon the convenience of the application, be a magnetic hard disk, may be an optical disk for read only, may be a write once optical disk, or may be a write-many-read-many type of optical disk.

Network Interface Card (NIC card) 22,010 is an interface between computer bus 22,002 and an external computer network 22,012. Connection 22,014 between the NIC card 22,010 and the network 22,012 may be direct as for example through a local network such as a Local Area Network (LAN), or may be through a dial up telephone connection, or may be through a cable television connection, etc.

Input and output interface card 22,020 (I/O card) provides an interface between computer bus 22,002 and input and output devices which gather data from the outside world, or generate an output which affects the outside world. Input and output devices include the monitor 22,022 of the computer on which the CPU 22,004 writes information, a printer (not shown, could also be on network 22,012 ) on which CPU 22,002 prints information, a mouse 22,024 for a user to interact with a graphical user interface (GUI), a television camera 22,026 which captures video images for the CPU to direct into storage in memory 22,006, microphones (not shown) which record sounds into memory 22,006, medical instruments which generate medically useful images, detector arrays employed in Earth orbiting satellites for observing either the Earth or for making astronomical observations, and any other type of sensor which can produce data for storage into memory 22,006, all such input or output devices being indicated as sensor N 22,028. Data from an I/O device is stored in memory 22,006 as a data structure. For example, image data can be stored as a matrix data structure as shown in FIG. 10. The image of FIG. 10 is stored in a pixel by pixel array as a two dimensional data structure having a at least one word reserved for each pixel, and can use several words for each pixel depending upon how much information is desired for each pixel.

Any data stored into memory 22,006 can be the subject of computation by CPU 22,004, can be stored to disk unit 22,008 for permanent storage, or can be transferred to another computer through network 22,012. Block diagram 22,000 represents a general purpose computer which can execute in CPU 22,004 a program stored in memory 22,006 to perform work which is useful to a user. Data stored in memory 22,006 in the form of data structures specialized for the particular application is written by CPU 22,004 into the appropriate data structures stored in memory 22,006, and the data can be read from the data structure as the CPU 22,004 needs the data during a computation. The data can also be written into permanent form for long term storage in disk unit 22,008.

Furthermore, the terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method of modeling an object using data, comprising:

storing said data as a frame in a pixel by pixel data structure, said data structure written into a computer memory;

selecting a set of starting points in a state space by a random selection process, said state space used for computing a probability density function;

computing a probability density function in response to said starting points, said probability density function giving a probability that a model represents said data, said probability density function plotted in state space, said state space having dimensions corresponding to parameters of said model;

determining multiple peaks in said probability density function, each said peak corresponding to a state space point, and each said state space point corresponding to a peak being referred to as a hypothesis point, and each said peak being a maximum of the probability density function;

computing a new probability density function in response to a plurality of said hypothesis points to determine a set of starting points to locate further peaks in said probability density function.

2. The method of claim 1 wherein said random selection process further comprises:

choosing a selected peak in said probability density function;

using a Gaussian selection process having a mean centered on said selected peak and a variance determined from said selected peak.

3. The method of claim 1 further comprising:

collecting said data as a sequence of frames of data, and computing said probability density function for a first frame of data as a first probability density function;

finding first peaks in said first probability density function, and selecting said set of starting points from said first peaks as a first set of starting points;

collecting a second frame of data;

computing a second probability density function in response to said second frame of data, and in response to said multiple peaks in said first probability density function;

starting a numerical search from said first set of starting points to find peaks in said second probability density function.

4. The method of claim 1 further comprising:

collecting said data as a single frame of data;

computing said probability density function as a first probability density function in response to said single frame of data and in response to a first model for said data as a first probability density function;

locating first peaks in said first probability density function and selecting first starting points in response to said first peaks;

computing a said probability density function as a second probability density function in response to said single frame of data and in response to a second model for said data as a second probability density function, and using said first starting points compute a numerical search for second peaks in said second probability function.

5. The method of claim 1 further comprising:

storing said data in a memory of a computer;

performing said computing step by a central processor unit in said computer.

6. The method of claim 1 further comprising:

choosing a number of said starting points in response to a value of said probability density function at a peak in said probability density function.

7. The method of claim 1 further comprising:

storing said data in a matrix data structure in a memory of a computer;

executing a program in a central processor unit of said computer, said computer reading and writing to said memory as said probability density function is searched numerically for peaks.

* * * * *